United States Patent
Rahman et al.

(10) Patent No.: US 12,537,567 B2
(45) Date of Patent: Jan. 27, 2026

(54) METHOD AND APPARATUS TO ENABLE CSI REPORTING BASED ON NON-UNIFORM SPACE-FREQUENCY COMPRESSION

(71) Applicant: Samsung Electronics Co., Ltd., Suwon-si (KR)

(72) Inventors: Md Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 164 days.

(21) Appl. No.: 18/366,568

(22) Filed: Aug. 7, 2023

(65) Prior Publication Data

US 2023/0379013 A1    Nov. 23, 2023

Related U.S. Application Data

(63) Continuation of application No. 17/814,226, filed on Jul. 21, 2022, now Pat. No. 11,722,185, which is a
(Continued)

(51) Int. Cl.
*H04B 7/0417*    (2017.01)
*H04B 7/0456*    (2017.01)
(Continued)

(52) U.S. Cl.
CPC ......... *H04B 7/0417* (2013.01); *H04B 7/0469* (2013.01); *H04B 7/0486* (2013.01);
(Continued)

(58) Field of Classification Search
CPC .................................................. H04B 7/0417
(Continued)

(56) References Cited

U.S. PATENT DOCUMENTS

| 11,476,901 | B2 | 10/2022 | Rahman |
| 2008/0019457 | A1 | 1/2008 | Waters |

(Continued)

FOREIGN PATENT DOCUMENTS

| CN | 103840907 A | 6/2014 |
| WO | 2008011451 A2 | 1/2008 |
| WO | 2017107084 A1 | 6/2017 |

OTHER PUBLICATIONS

International Search Report and Written Opinion issued Aug. 14, 2019 regarding International Application No. PCT/KR2019/005147, 7 pages.
(Continued)

*Primary Examiner* — Lihong Yu

(57) ABSTRACT

A method of a user equipment (UE) for a channel state information (CSI) feedback in a wireless communication system is provided. The method comprises receiving, from a base station (BS), CSI feedback configuration information including a number ($K_0$) of coefficients for the CSI feedback, deriving, based on the CSI feedback configuration information, the CSI feedback including $K_1$ coefficients that are a subset of a total of Q coefficients, wherein $K_1 \leq K_0$ and $K_0 < Q$, and transmitting, to the BS, the CSI feedback including the $K_1$ coefficients over an uplink channel.

17 Claims, 21 Drawing Sheets

Related U.S. Application Data continuation of application No. 16/395,073, filed on Apr. 25, 2019, now Pat. No. 11,476,901.

(60) Provisional application No. 62/797,418, filed on Jan. 28, 2019, provisional application No. 62/779,262, filed on Dec. 13, 2018, provisional application No. 62/756,267, filed on Nov. 6, 2018, provisional application No. 62/681,357, filed on Jun. 6, 2018, provisional application No. 62/663,708, filed on Apr. 27, 2018.

(51) Int. Cl.
*H04B 7/06* (2006.01)
*H04L 5/00* (2006.01)

(52) U.S. Cl.
CPC .......... *H04B 7/0626* (2013.01); *H04L 5/005* (2013.01); *H04L 5/0053* (2013.01)

(58) Field of Classification Search
USPC ....................................... 375/267
See application file for complete search history.

(56) References Cited

U.S. PATENT DOCUMENTS

| | | | |
|---|---|---|---|
| 2014/0362939 A1* | 12/2014 | Kuo | H04B 7/0632 375/267 |
| 2015/0289155 A1 | 10/2015 | Gao | |
| 2017/0207842 A1 | 7/2017 | Kim | |
| 2017/0302353 A1 | 10/2017 | Rahman | |
| 2018/0076870 A1 | 3/2018 | Kim | |
| 2018/0176809 A1 | 6/2018 | Gao | |

OTHER PUBLICATIONS

NTT Docomo, "CSI Feedback Type II for NR MIMO", 3GPP TSG RAN WG1 Meeting #88, R1-1702843, Feb. 2017, 7 pages.
Intel Corporation, "On NR Type II category 2 codebook", 3GPP TSG RAN WG1 Meeting #88, R1-1702206, Feb. 2017, 5 pages.
Korean Intellectual Property Office, Office Action issued Jul. 1, 2024 regarding Application No. 10-2020-7031053, 9 pages.
Nokia et al., "Remaining details for Type I and Type II CSI reporting", 3GPP TSG RAN WG1 Meeting AH 1801, R1-1800754, Jan. 2018, 6 pages.
"3rd Generation Partnership Project; Technical Specification Group Services and System Aspects; Feasibility Study on New Services and Markets Technology Enablers; Stage 1 (Release 14)", 3GPP Tr 22.891 V14.2.0, Sep. 2016, 95 pages.
"3rd Generation Partnership Project; Technical Specification Group Radio Access Network; Evolved Universal Terrestrial Radio Access (E-UTRA); Physical channels and modulation (Release 13)", 3GPP TS 36.211 V13.0.0, Dec. 2015, 141 pages.
"3rd Generation Partnership Project; Technical Specification Group Radio Access Network; Evolved Universal Terrestrial Radio Access (E-UTRA); Multiplexing and channel coding (Release 13)", 3GPP TS 36.212 V13.0.0, Dec. 2015, 121 pages.
"3rd Generation Partnership Project; Technical Specification Group Radio Access Network; Evolved Universal Terrestrial Radio Access (E-UTRA); Physical layer procedures (Release 13)", 3GPP TS 36.213 V13.0.0, Dec. 2015, 326 pages.
"3rd Generation Partnership Project; Technical Specification Group Radio Access Network; Evolved Universal Terrestrial Radio Access (E-UTRA); Medium Access Control (MAC) protocol specification (Release 13)", 3GPP TS 36.321 V13.0.0, Dec. 2015, 82 pages.
"3rd Generation Partnership Project; Technical Specification Group Services and System Aspects; Feasibility Study on New Services and Markets Technology Enablers; Stage 1 (Release 14)", 3GPP TR 22.891 V1.2.0, Nov. 2015, 96 pages.
Supplementary European Search Report dated Apr. 12, 2021, in connection with European Patent Application No. 19792323.8, 11 pages.
China National Intellectual Property Administration, Notification of the First Office Action dated Mar. 29, 2023 regarding Application No. 201980028683.2, 12 pages.
LG Electronics, "Remaining issues on CSI reporting", 3GPP TSG RAN WG1 Meeting #92bis, R1-1804543, Apr. 2018, 2 pages.
European Patent Office, Communication pursuant to Article 94(3) EPC dated Jun. 6, 2023 regarding Application No. 19792323.8, 6 pages.
Korean Intellectual Property Office, Notice of Intention to Grant issued Feb. 5, 2025, regarding Application No. 10-2020-7031053, 4 pages.
European Patent Office, Communication pursuant to Article 94(3) EPC issued May 2, 2025 regarding Application No. 19792323.8, 5 pages.

* cited by examiner

METHOD AND APPARATUS TO ENABLE CSI REPORTING BASED ON NON-UNIFORM SPACE-FREQUENCY COMPRESSION

CROSS-REFERENCE TO RELATED APPLICATIONS AND CLAIM OF PRIORITY

This application is a continuation of U.S. patent application Ser. No. 17/814,226, filed on Jul. 21, 2022, which is a continuation of U.S. patent application Ser. No. 16/395,073, filed on Apr. 25, 2019, now U.S. Pat. No. 11,476,901, which claims priority to: U.S. Provisional Patent Application No. 62/663,708, filed on Apr. 27, 2018; U.S. Provisional Patent Application No. 62/681,357 filed on Jun. 6, 2018; U.S. Provisional Patent Application No. 62/756,267 filed on Nov. 6, 2018; U.S. Provisional Patent Application No. 62/779,262 filed on Dec. 13, 2018; and U.S. Provisional Patent Application No. 62/797,418 filed on Jan. 28, 2019. The content of the above-identified patent documents is incorporated herein by reference.

TECHNICAL FIELD

The present disclosure relates generally to CSI reporting based on non-uniform space-frequency compression for next generation cellular systems.

BACKGROUND

Understanding and correctly estimating the channel in an advance wireless communication system between a user equipment (UE) and an gNode B (gNB) is important for efficient and effective wireless communication. In order to correctly estimate the channel conditions, the UE may report (e.g., feedback) information about channel measurement, e.g., CSI, to the gNB. With this information about the channel, the gNB is able to select appropriate communication parameters to efficiently and effectively perform wireless data communication with the UE.

SUMMARY

Embodiments of the present disclosure provide methods and apparatuses to enable CSI reporting based on non-uniform space-frequency compression in an advanced wireless communication system.

In one embodiment, a user equipment (UE) for a channel state information (CSI) feedback in a wireless communication system is provided. The UE comprises a transceiver configured to receive, from a base station (BS), CSI feedback configuration information including a number ($K_0$) of coefficients for the CSI feedback. The UE further comprises a processor operably connected to the transceiver, the processor configured to derive, based on the CSI feedback configuration information, the CSI feedback including $K_1$ coefficients that are a subset of a total of Q coefficients, wherein $K_1 \leq K_0$ and $K_0 < Q$. The transceiver of the UE is further configured to transmit, to the BS, the CSI feedback including the $K_1$ coefficients over an uplink channel.

In another embodiment, a base station (BS) for a channel state information (CSI) feedback in a wireless communication system is provided. The BS comprises a transceiver configured to transmit, to a user equipment (UE), CSI feedback configuration information including a number ($K_0$) of coefficients for the CSI feedback and receive, from the UE, the CSI feedback including $K_1$ coefficients over an uplink channel. The BS further comprises a processor operably connected to the transceiver, the processor is configured to decode the CSI feedback including $K_1$ coefficients. The CSI feedback is derived based on the CSI feedback configuration information and the CSI feedback includes the $K_1$ coefficients that are a subset of a total of Q coefficients, wherein $K_1 \leq K_0$ and $K_0 < Q$.

In yet another embodiment, a method of a user equipment (UE) for a channel state information (CSI) feedback in a wireless communication system is provided. The method comprises receiving, from a base station (BS), CSI feedback configuration information including a number ($K_0$) of coefficients for the CSI feedback, deriving, based on the CSI feedback configuration information, the CSI feedback including $K_1$ coefficients that are a subset of a total of Q coefficients, wherein $K_1 \leq K_0$ and $K_0 < Q$, and transmitting, to the BS, the CSI feedback including the $K_1$ coefficients over an uplink channel.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
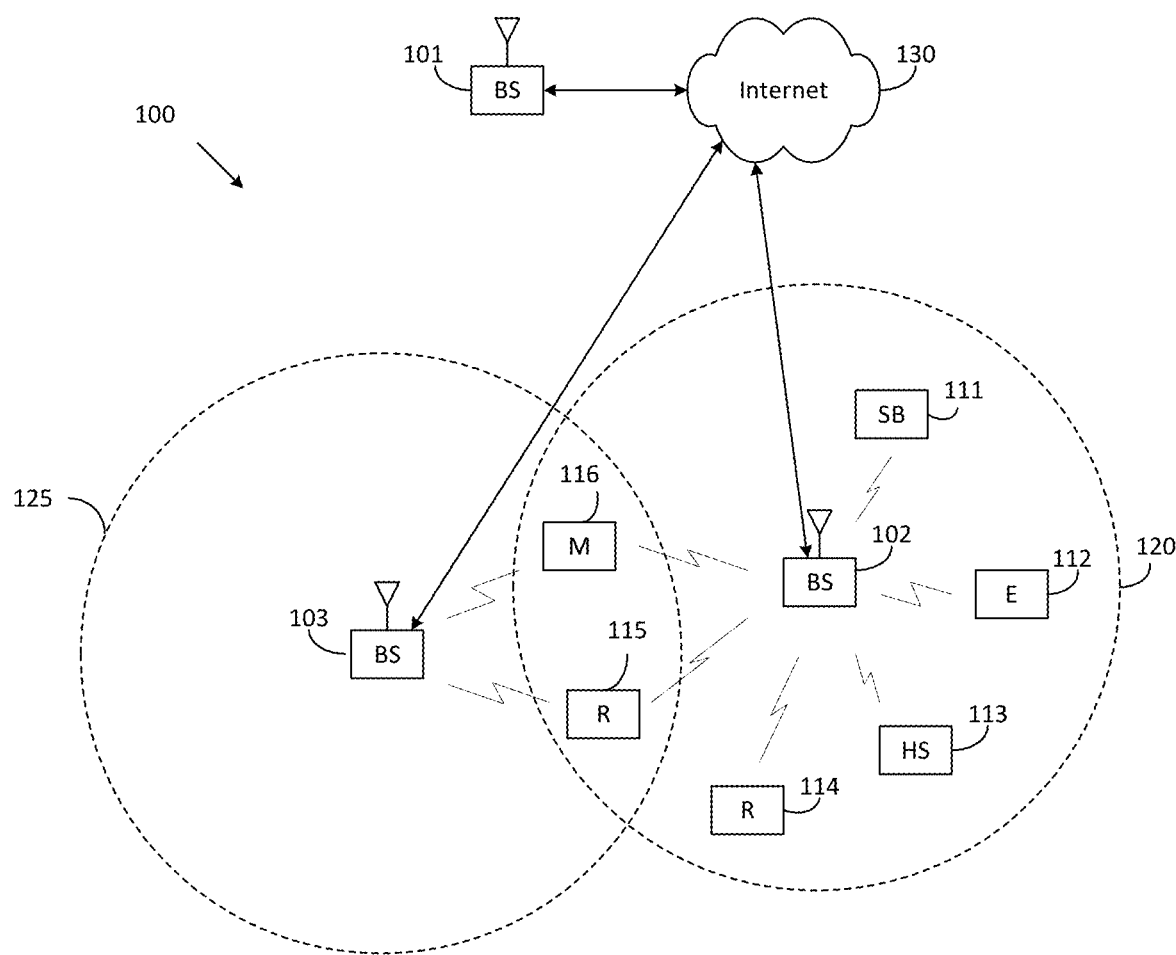
FIG. 1 illustrates an example wireless network according to embodiments of the present disclosure.

FIG. 1 through FIG. 23, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v15.5.0, "E-UTRA, Physical channels and modulation;" 3GPP TS 36.212 v15.5.0, "E-UTRA, Multiplexing and Channel coding;" 3GPP TS 36.213 v15.5.0, "E-UTRA, Physical Layer Procedures;" 3GPP TS 36.321 v15.5.0, "E-UTRA, Medium Access Control (MAC) protocol specification;" 3GPP TS 36.331 v15.5.0, "E-UTRA, Radio Resource Control (RRC) protocol specification;" 3GPP TR 22.891 v14.2.0; 3GPP TS 38.212 v15.5.0, "E-UTRA, NR, Multiplexing and Channel coding;" and 3GPP TS 38.214 v15.5.0, "E-UTRA, NR, Physical layer procedures for data."

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), this disclosure can be extended to other OFDM-based transmission waveforms or multiple access schemes such as filtered OFDM (F-OFDM).

The present disclosure covers several components which can be used in conjunction or in combination with one another, or can operate as standalone schemes.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 2:
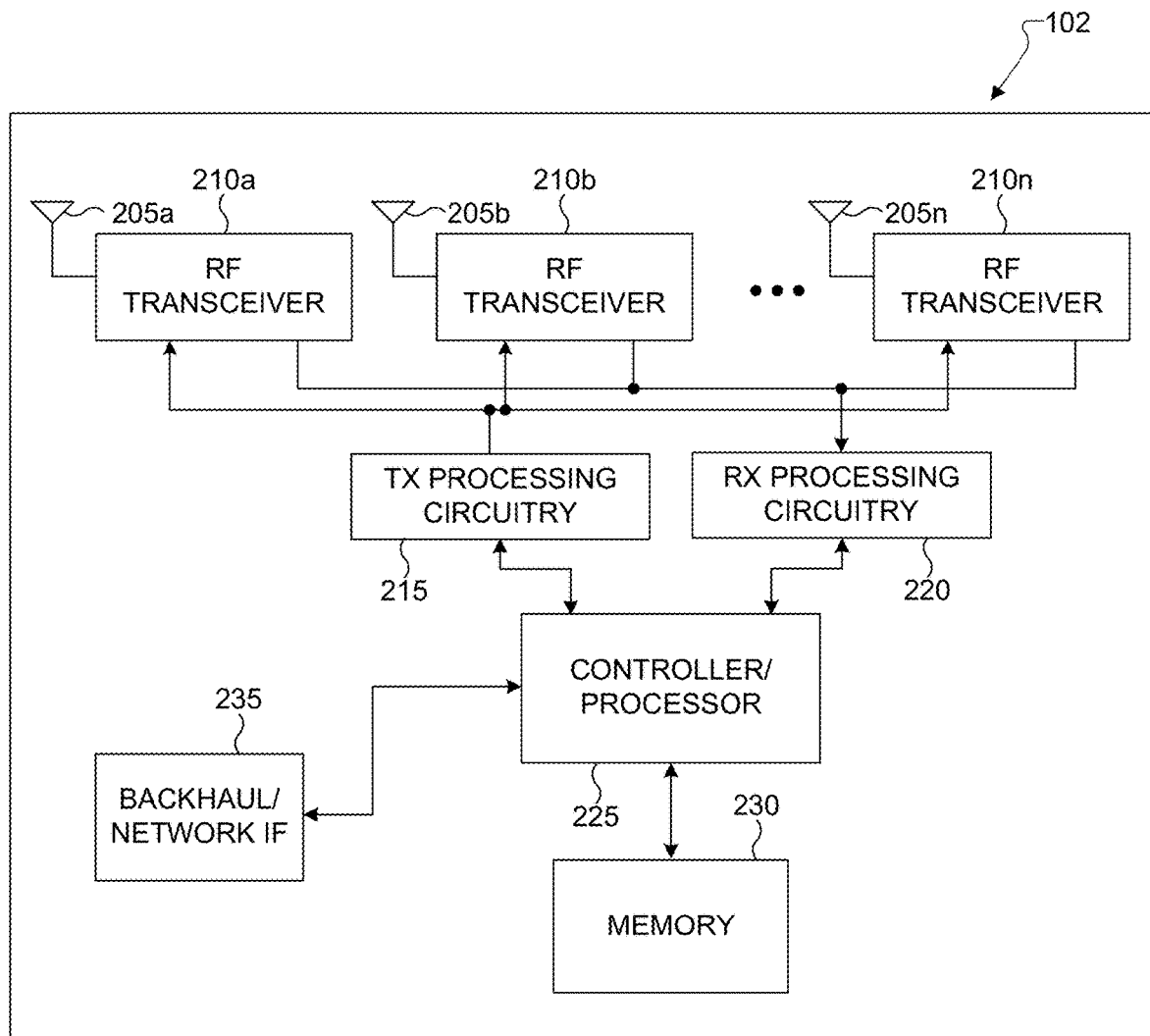
FIG. 2 illustrates an example gNB according to embodiments of the present disclosure.
Figure 3:
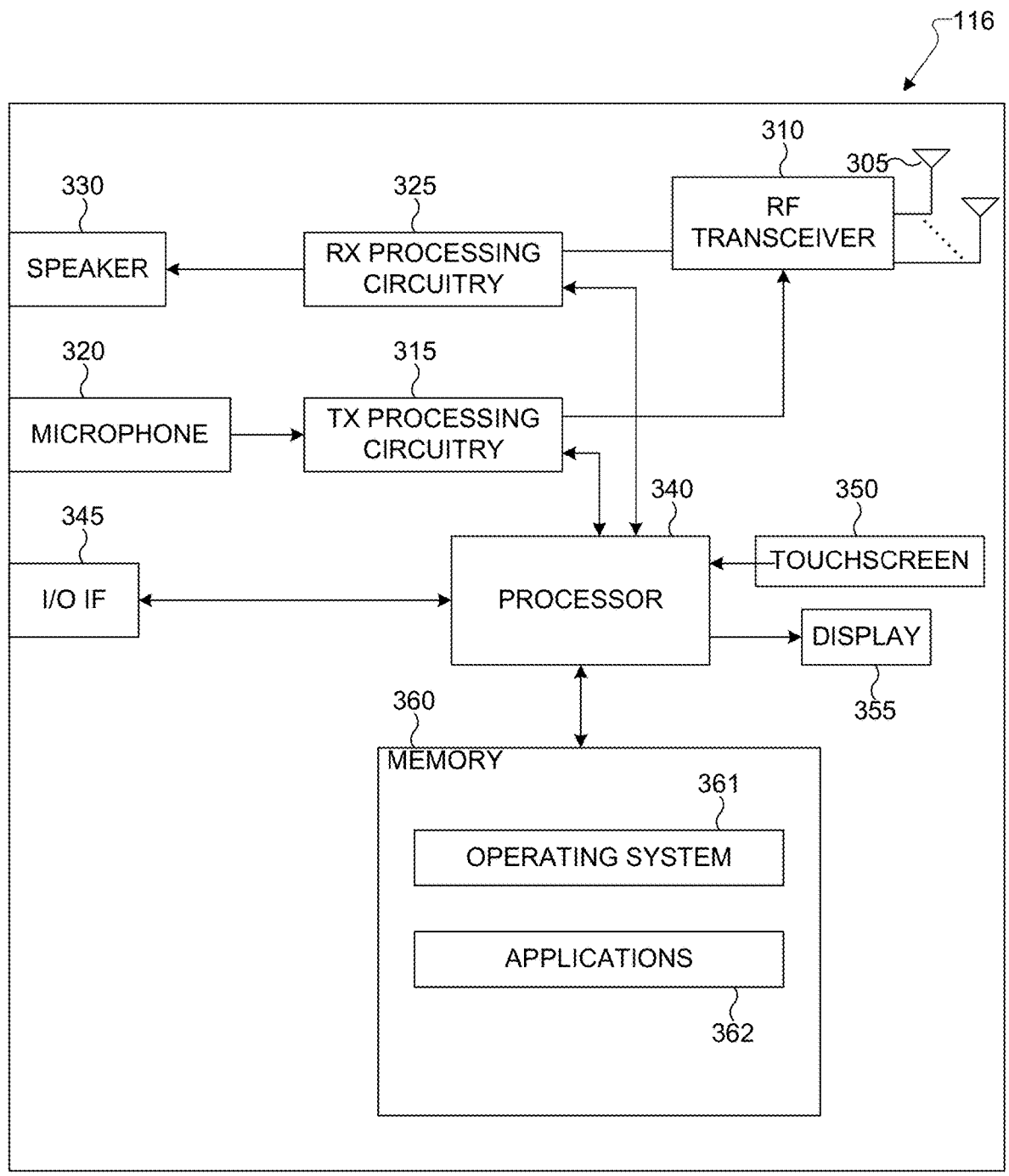
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for efficient CSI reporting in an advanced wireless communication system. In certain embodiments, and one or more of the gNBs 101-103 includes circuitry, programing, or a combination thereof, for CSI acquisition based on space-frequency compression in an advanced wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on uplink channel. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
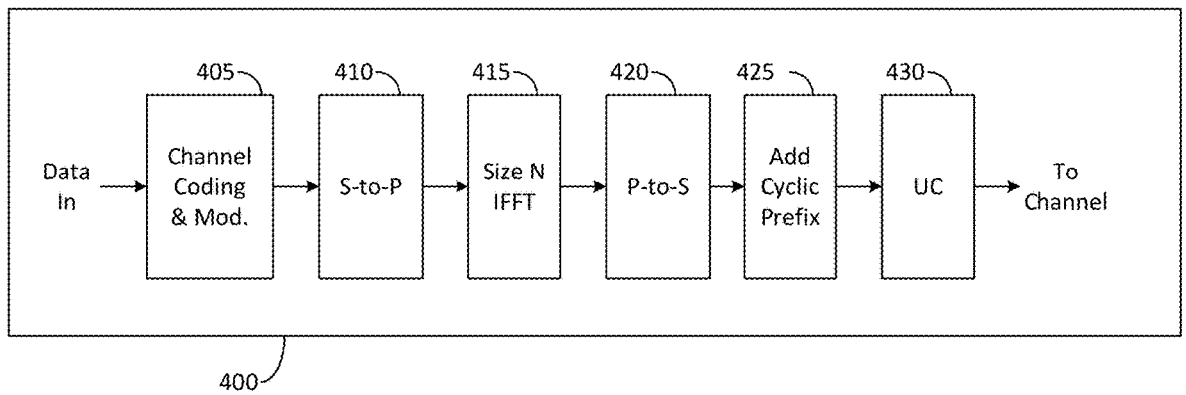
FIG. 4A illustrates a high-level diagram of an orthogonal frequency division multiple access transmit path according to embodiments of the present disclosure.
Figure 4B:
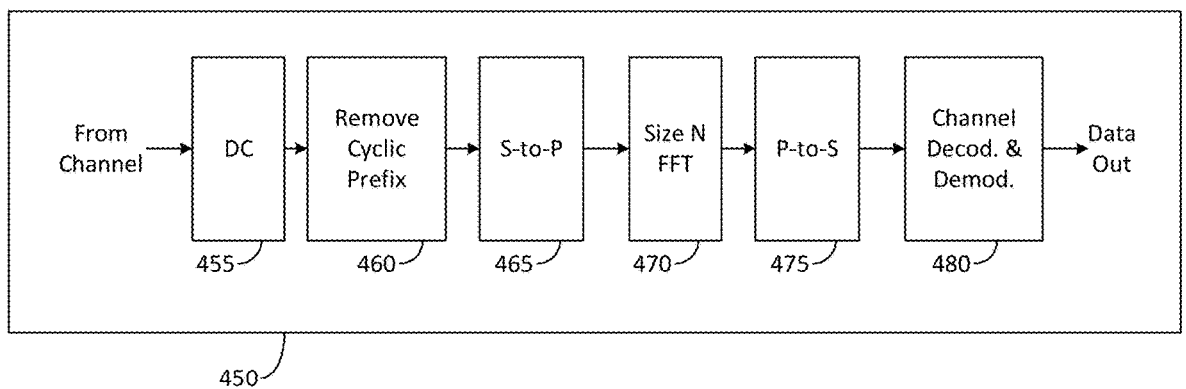
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at the gNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{SC}^{RB}$ sub-carriers, or resource elements (REs), such as 12 REs. A unit of one RB over one subframe is referred to as a PRB. A UE can be allocated $M_{PDSCH}$ RBs for a total of $M_{SC}^{PDSCH} = M_{PDSCH} \cdot N_{SC}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{SC}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 5:
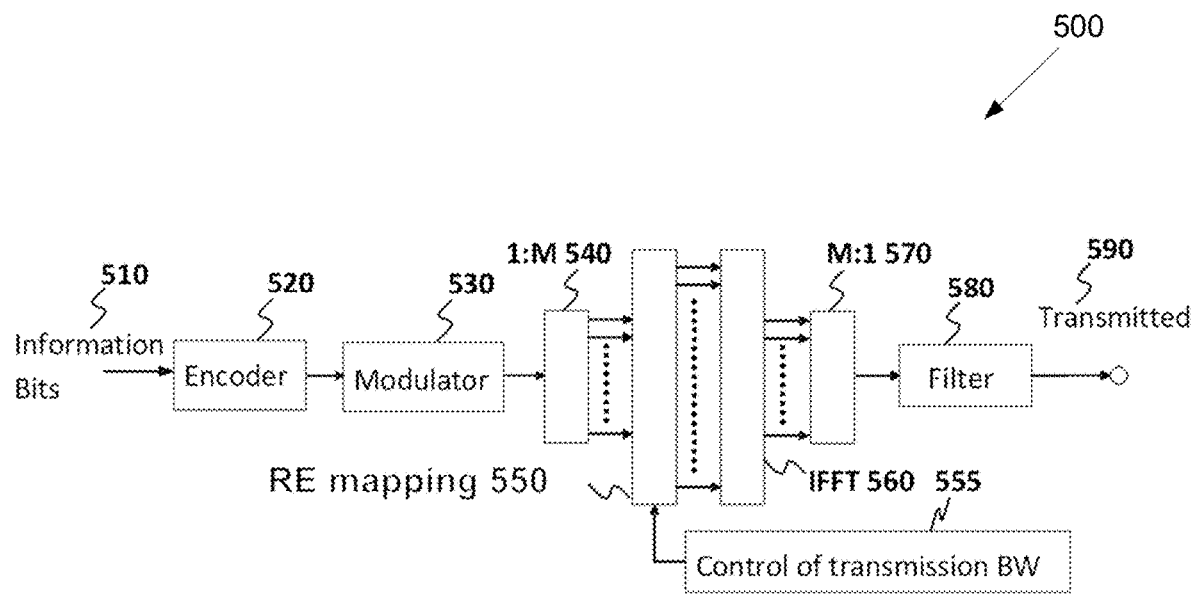
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
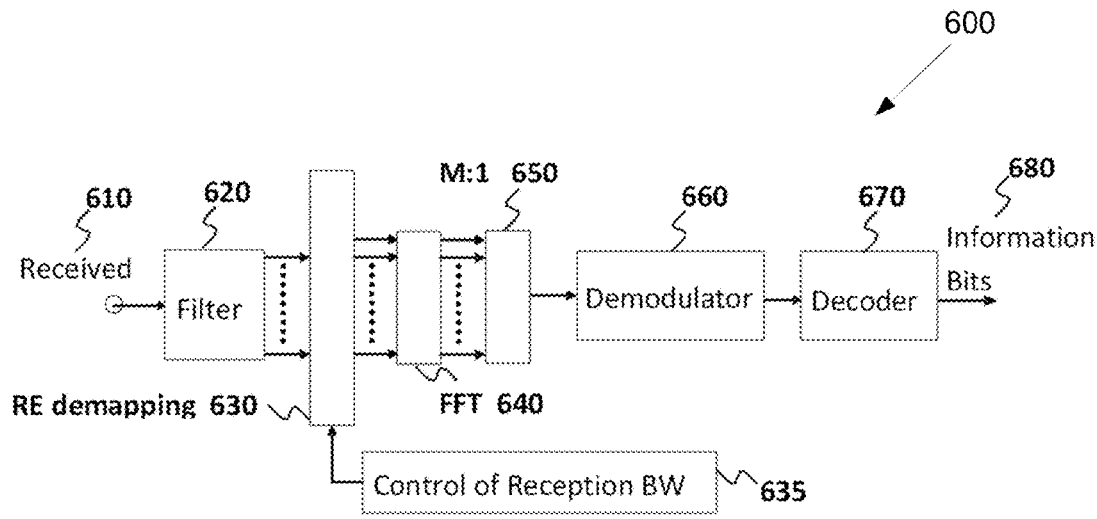
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
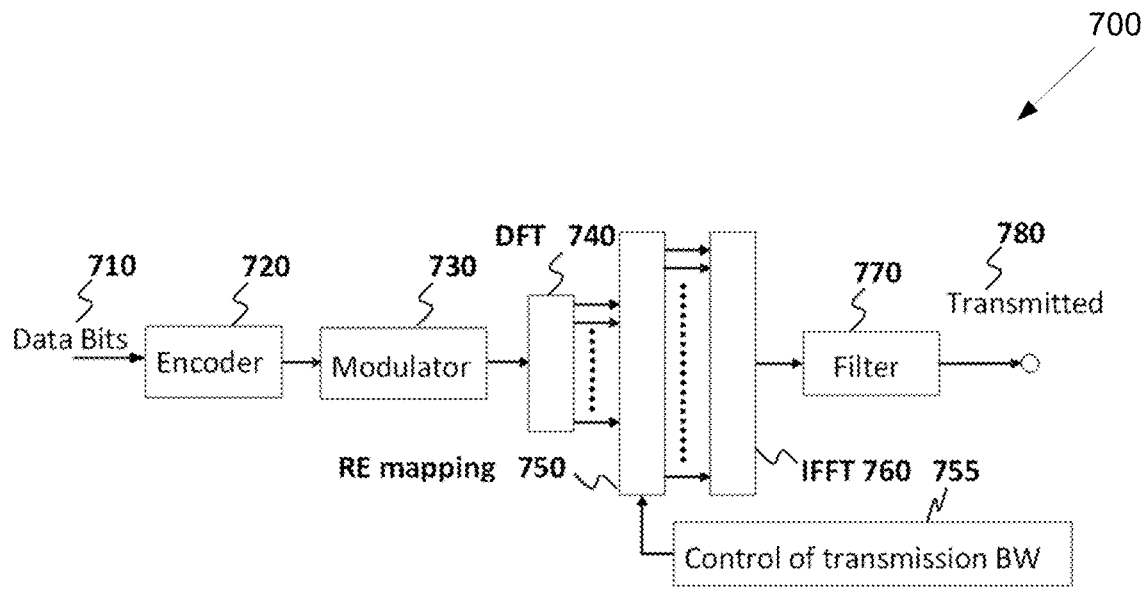
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
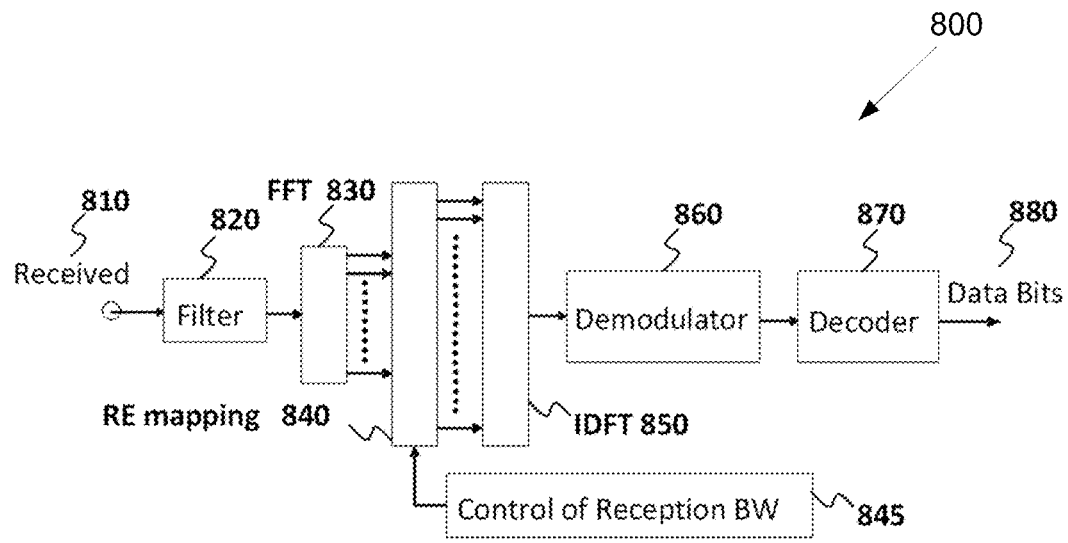
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases has been identified and described; those use cases can be roughly categorized into three different groups. A first group is termed "enhanced mobile broadband (eMBB)," targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per km' with less stringent the reliability, data rate, and latency requirements.

In order for the 5G network to support such diverse services with different quality of services (QoS), one method has been identified in 3GPP specification, called network slicing. To utilize PHY resources efficiently and multiplex various slices (with different resource allocation schemes, numerologies, and scheduling strategies) in DL-SCH, a flexible and self-contained frame or subframe design is utilized.

Figure 9:
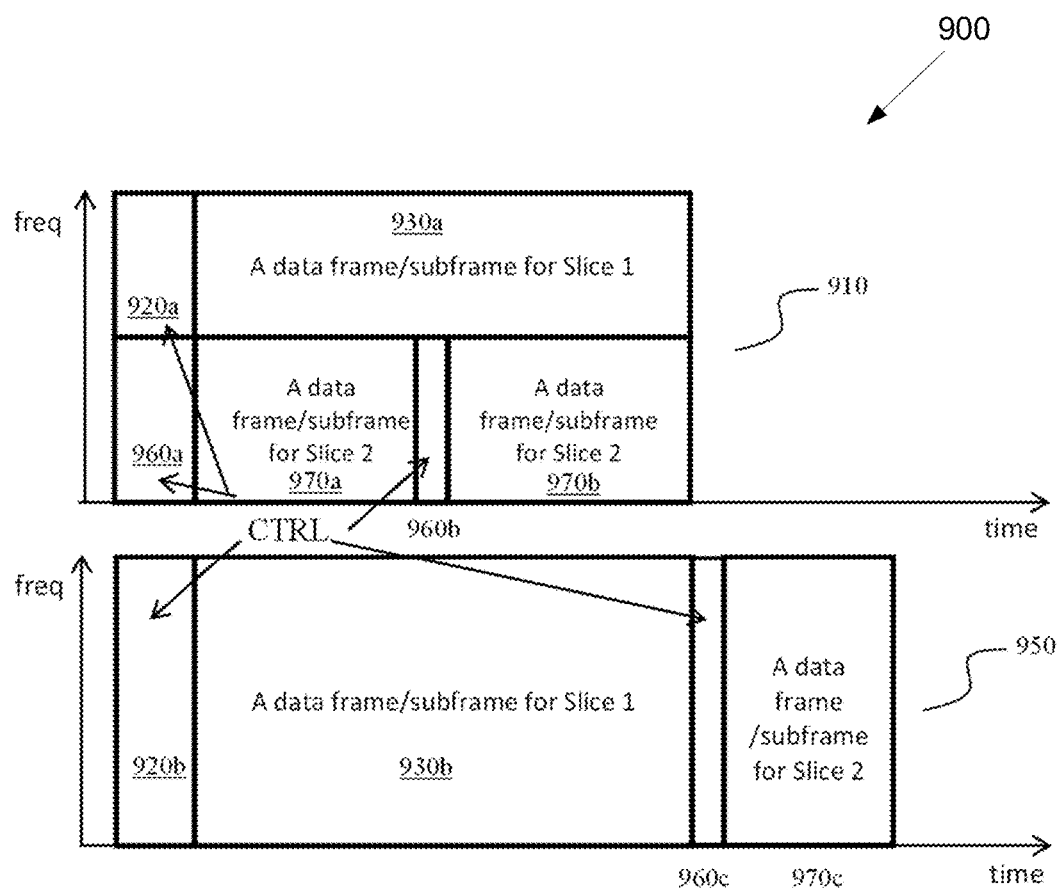
FIG. 9 illustrates an example multiplexing of two slices according to embodiments of the present disclosure.

FIG. 9 illustrates an example multiplexing of two slices 900 according to embodiments of the present disclosure. The embodiment of the multiplexing of two slices 900 illustrated in FIG. 9 is for illustration only. FIG. 9 does not limit the scope of this disclosure to any particular implementation of the multiplexing of two slices 900.

Two exemplary instances of multiplexing two slices within a common subframe or frame are depicted in FIG. 9. In these exemplary embodiments, a slice can be composed of one or two transmission instances where one transmission instance includes a control (CTRL) component (e.g., 920*a*, 960*a*, 960*b*, 920*b*, or 960*c*) and a data component (e.g., 930*a*, 970*a*, 970*b*, 930*b*, or 970*c*). In embodiment 910, the two slices are multiplexed in frequency domain whereas in embodiment 950, the two slices are multiplexed in time domain. These two slices can be transmitted with different sets of numerology.

3GPP specification supports up to 32 CSI-RS antenna ports which enable an gNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 10:
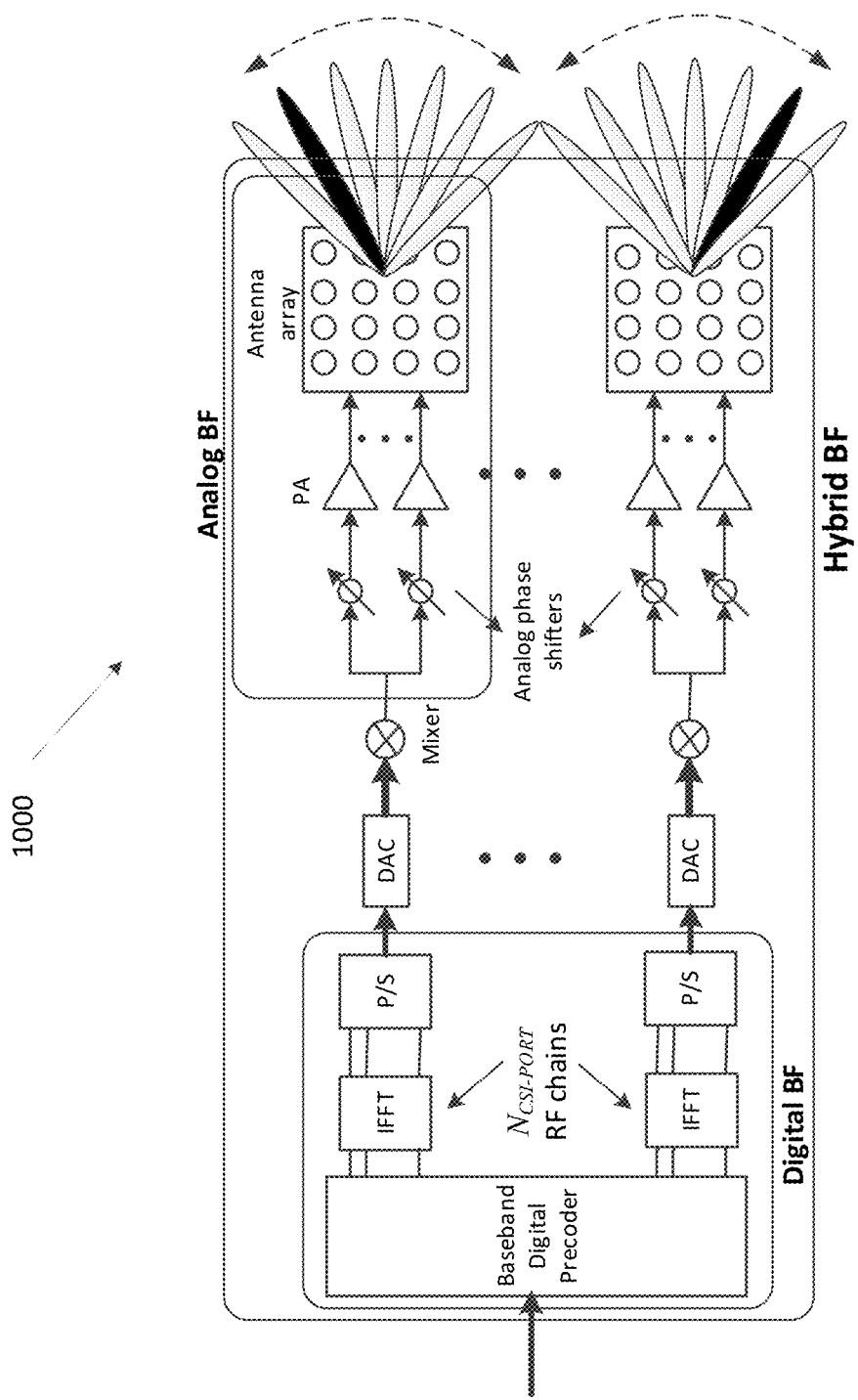
FIG. 10 illustrates an example antenna blocks according to embodiments of the present disclosure.

FIG. 10 illustrates an example antenna blocks 1000 according to embodiments of the present disclosure. The embodiment of the antenna blocks 1000 illustrated in FIG. 10 is for illustration only. FIG. 10 does not limit the scope of this disclosure to any particular implementation of the antenna blocks 1000.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters. One CSI-RS port can then correspond to one sub-array which produces a narrow analog beam through analog beamforming. This analog beam can be configured to sweep across a wider range of angles by varying the phase shifter bank across symbols or subframes. The number of sub-arrays (equal to the number of RF chains) is the same as the number of CSI-RS ports $N_{CSI-PORT}$. A digital beamforming unit performs a linear combination across $N_{CSI-PORT}$ analog beams to further increase precoding gain. While analog beams are wideband (hence not frequency-selective), digital precoding can be varied across frequency sub-bands or resource blocks.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

Figure 11:
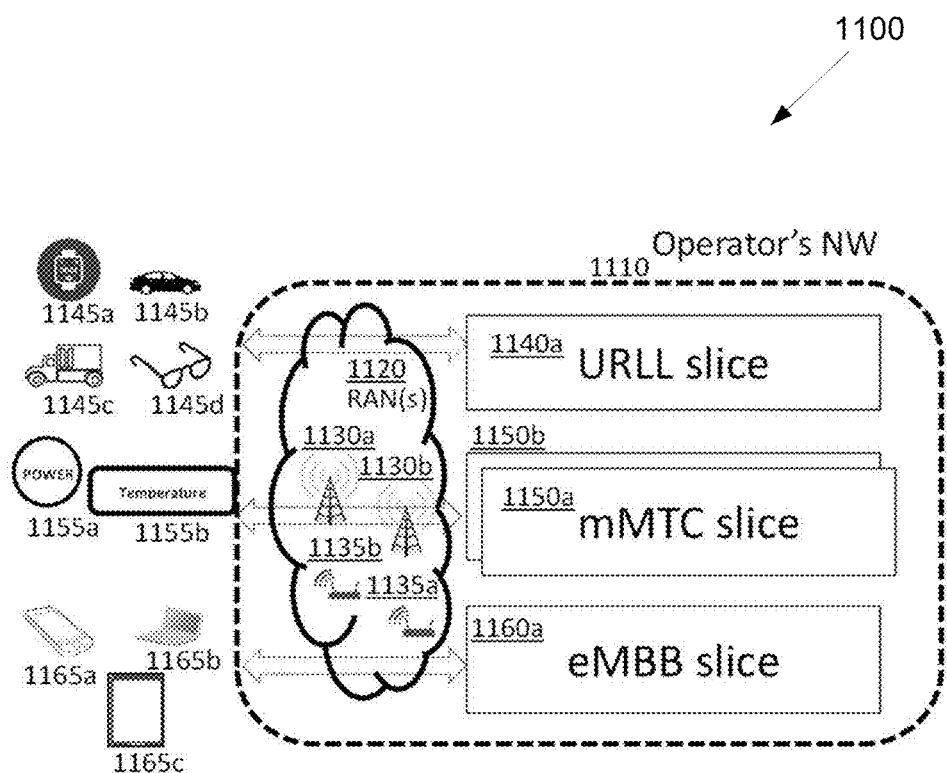
FIG. 11 illustrates an example network configuration according to embodiments of the present disclosure.

FIG. 11 illustrates an example network configuration 1100 according to embodiments of the present disclosure. The embodiment of the network configuration 1100 illustrated in FIG. 11 is for illustration only. FIG. 11 does not limit the scope of this disclosure to any particular implementation of the configuration 1100.

In order for the 5G network to support such diverse services with different quality of services (QoS), one scheme has been identified in 3GPP specification, called network slicing.

As shown in FIG. 11, An operator's network 1110 includes a number of radio access network(s) 1120 (RAN(s)) that are associated with network devices such as gNBs 1130*a* and 1130*b*, small cell base stations (femto/pico gNBs or Wi-Fi access points) 1135*a* and 1135*b*. The network 1110 can support various services, each represented as a slice.

In the example, an URLL slice 1140*a* serves UEs requiring URLL services such as cars 1145*b*, trucks 1145*c*, smart watches 1145*a*, and smart glasses 1145*d*. Two mMTC slices 1150a and 550b serve UEs requiring mMTC services such as power meters 555b, and temperature control box 1155b. One eMBB slice 1160a serves UEs requiring eMBB services such as cells phones 1165a, laptops 1165b, and tablets 1165c. A device configured with two slices can also be envisioned.

Figure 12:
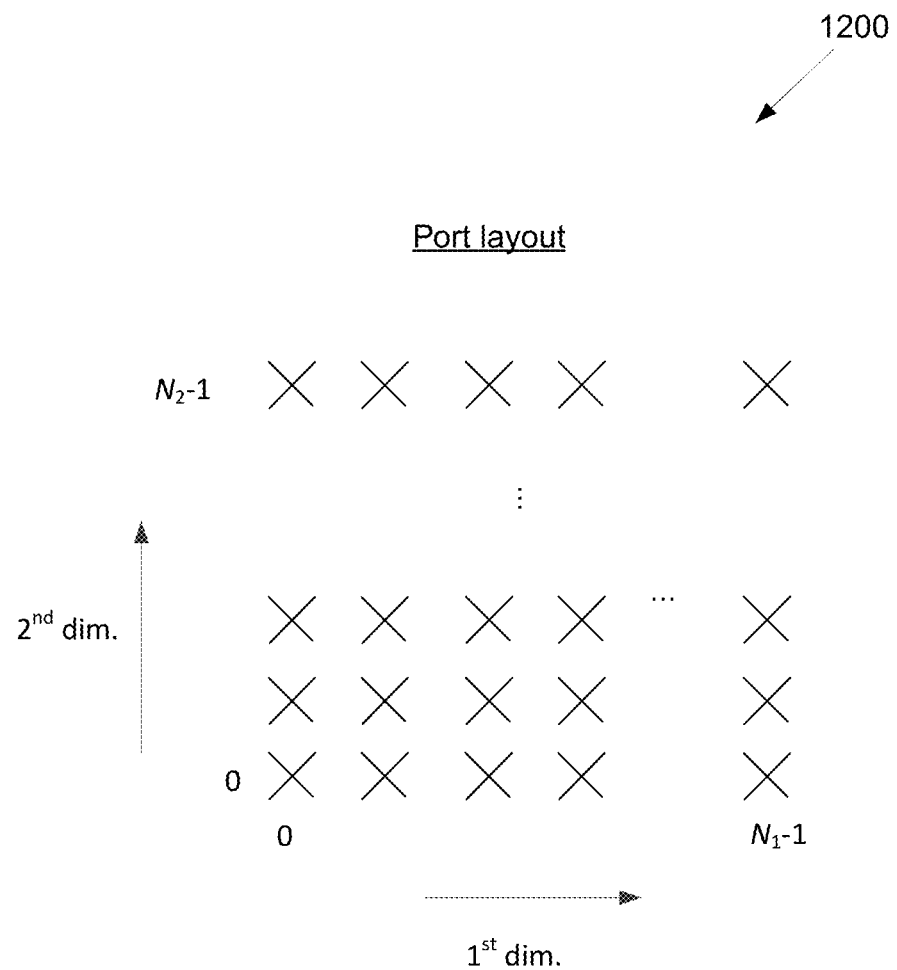
FIG. 12 illustrates an example antenna port layout according to embodiments of the present disclosure.

FIG. 12 illustrates an example antenna port layout 1200 according to embodiments of the present disclosure. The embodiment of the antenna port layout 1200 illustrated in FIG. 12 is for illustration only. FIG. 12 does not limit the scope of this disclosure to any particular implementation.

In the present disclosure, it is assumed that $N_1$ and $N_2$ are the number of antenna ports with the same polarization in the first and second dimensions, respectively. For 2D antenna port layouts, $N_1 > 1$, $N_2 > 1$, and for 1D antenna port layouts $N_1 > 1$ and $N_2 = 1$. So, for a dual-polarized antenna port layout, the total number of antenna ports is $2N_1N_2$. An illustration is shown in FIG. 12.

A UE is configured with high-resolution (e.g., Type II) CSI reporting in which the linear combination based Type II CSI reporting framework is extended to include frequency dimension in addition to the 1st and 2nd antenna port dimensions.

Figure 13:
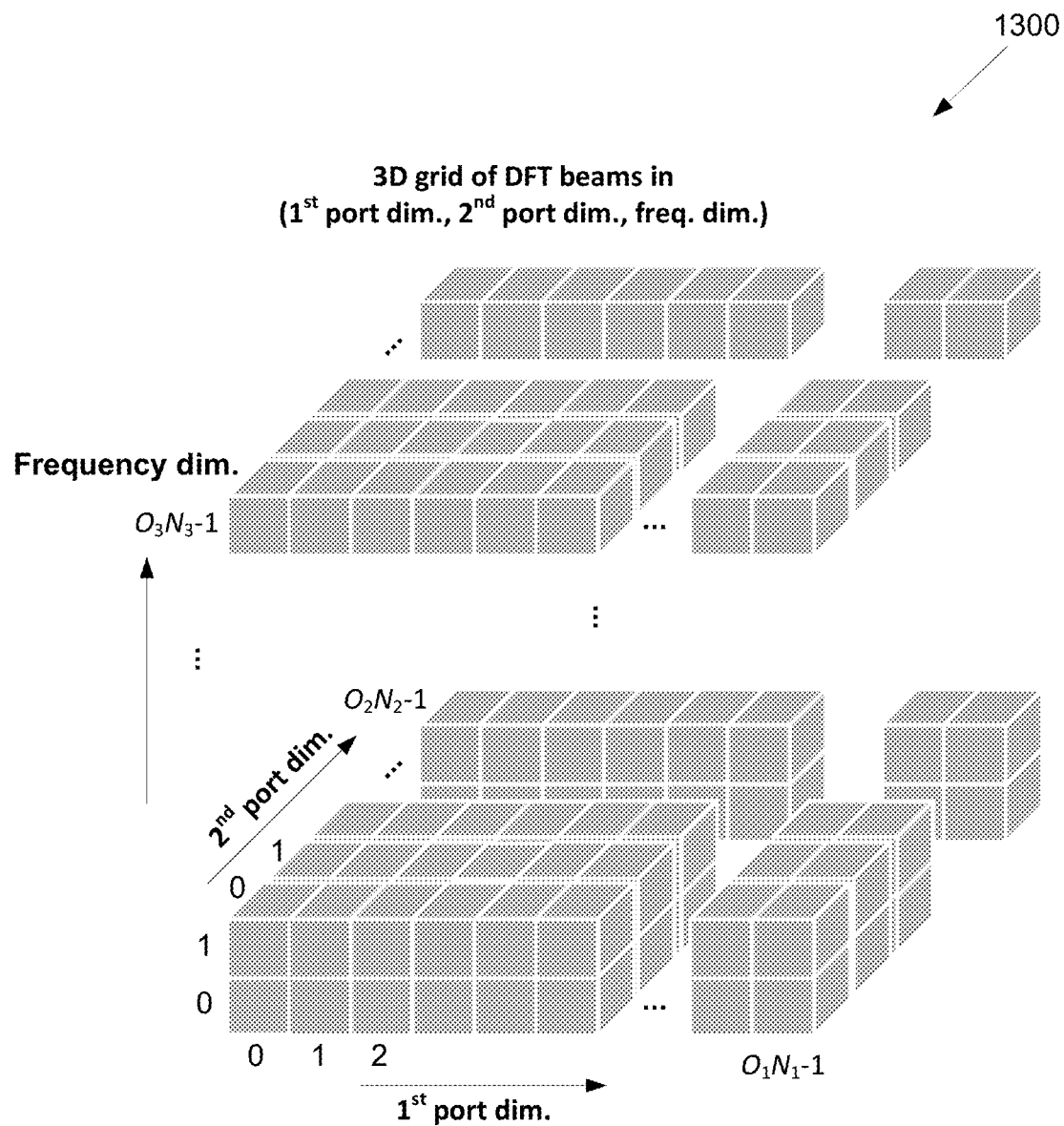
FIG. 13 illustrates an example 3D grid of DFT beams according to embodiments of the present disclosure.

FIG. 13 illustrates an example 3D grid of DFT beams 1300 according to embodiments of the present disclosure. The embodiment of the 3D grid of DFT beams 1300 illustrated in FIG. 13 is for illustration only. FIG. 13 does not limit the scope of this disclosure to any particular implementation.

An illustration of the 3D grid of the oversampled DFT beams (1st port dim., 2nd port dim., freq. dim.) is shown in FIG. 13 in which: 1st dimension is associated with the 1st port dimension; 2nd dimension is associated with the 2nd port dimension; and 3rd dimension is associated with the frequency dimension.

The basis sets for $1^{st}$ and $2^{nd}$ port domain representation are oversampled DFT codebooks of length-$N_1$ and length-$N_2$, respectively, and with oversampling factors $O_1$ and $O_2$, respectively. Likewise, the basis set for frequency domain representation (i.e., 3rd dimension) is an oversampled DFT codebook of length-$N_3$ and with oversampling factor $O_3$. In one example, $O_1 = O_2 = O_3 = 4$. In another example, the oversampling factors $O_i$, belongs to $\{2, 4, 8\}$. In yet another example, at least one of $O_1$, $O_2$, and $O_3$ is higher layer configured (via RRC signaling).

A UE is configured with higher layer parameter CodebookType set to "TypeII-Compression" or "TypeIII" for an enhanced Type II CSI reporting in which the pre-coders for all SBs and for a given layer l=1, . . . , v, where v is the associated RI value, is given by either $$W^l = AC_lB^H = [a_0 \ a_1 \ \ldots \ a_{L-1}]\begin{bmatrix} c_{l,0,0} & c_{l,0,1} & \ldots & c_{l,0,K-1} \\ c_{l,1,0} & c_{l,1,1} & \ldots & c_{l,1,K-1} \\ \vdots & \vdots & \vdots & \vdots \\ c_{l,L-1,0} & c_{l,L-1,1} & \ldots & c_{l,L-1,K-1} \end{bmatrix} \quad \text{(Eq. 1)}$$

$$[b_0 \ b_1 \ \ldots \ b_{K-1}]^H = \sum_{k=0}^{K-1}\sum_{i=0}^{L-1} c_{l,i,k}(a_i b_k^H),$$

or (Eq. 2)

$$W^l = \begin{bmatrix} A & 0 \\ 0 & A \end{bmatrix} C_l B^H =$$

$$\begin{bmatrix} a_0 a_1 \ldots a_{L-1} & 0 \\ 0 & a_0 a_1 \ldots a_{L-1} \end{bmatrix}\begin{bmatrix} c_{l,0,0} & c_{l,0,1} & \ldots & c_{l,0,K-1} \\ c_{l,1,0} & c_{l,1,1} & \ldots & c_{l,1,K-1} \\ \vdots & \vdots & \vdots & \vdots \\ c_{l,2L-1,0} & c_{l,2L-1,1} & \ldots & c_{l,2L-1,K-1} \end{bmatrix}$$

-continued $$[b_0 \ b_1 \ \ldots \ b_{K-1}]^H = \begin{bmatrix} \sum_{k=0}^{K-1}\sum_{i=0}^{L-1} c_{l,i,k}(a_i b_k^H) \\ \sum_{k=0}^{K-1}\sum_{i=0}^{L-1} c_{l,i+L,k}(a_i b_k^H) \end{bmatrix},$$

where: $N_1$ is a number of antenna ports in a first antenna port dimension; $N_2$ is a number of antenna ports in a second antenna port dimension; $N_3$ is a number of SBs or frequency domain n (FD) units (that comprise the CSI reporting band); $a_i$ is a $2N_1N_2 \times 1$ (Eq. 1) or $N_1N_2 \times 1$ (Eq. 2) column vector; $b_k$ is a $N_3 \times 1$ column vector; and $c_{l,i,k}$ is a complex coefficient.

The columns of $W^l$ are normalized to norm one. For rank R or R layers (v=R), the pre-coding matrix is given by $$W^{(R)} = \frac{1}{\sqrt{R}}[W^1 \ W^2 \ \ldots \ W^R].$$

Eq. 2 is assumed in the rest of the disclosure. The embodiments of the disclosure, however, are general and are also application to Eq. 1.

Here $L \leq 2N_1N_2$ and $K \leq N_3$. If $L=2N_1N_2$, then A is an identity matrix, and hence not reported. Likewise, if $K=N_3$, then B is an identity matrix, and hence not reported. Assuming $L < 2N_1N_2$, in an example, to report columns of A, the oversampled DFT codebook is used. For instance, $a_i = v_{l,m}$ where the quantity $v_{l,m}$ is given by $$u_m = \begin{cases} \begin{bmatrix} 1 & e^{j\frac{2\pi m}{O_2 N_2}} & \ldots & e^{j\frac{2\pi m(N_2-1)}{O_2 N_2}} \end{bmatrix} & N_2 > 1 \\ 1 & N_2 = 1 \end{cases}.$$

$$v_{l,m} = \begin{bmatrix} u_m & e^{j\frac{2\pi l}{O_1 N_1}} u_m & \ldots & e^{j\frac{2\pi l(N_1-1)}{O_1 N_1}} u_m \end{bmatrix}^T$$

Similarly, assuming $K < N_3$, in an example, to report columns of B, the oversampled DFT codebook is used. For instance, $b_k = w_k$, where the quantity $w_k$ is given by $$w_k = \begin{bmatrix} 1 & e^{j\frac{2\pi k}{O_3 N_3}} & \ldots & e^{j\frac{2\pi k(N_3-1)}{O_3 N_3}} \end{bmatrix}.$$

In another example, discrete cosine transform DCT basis is used to construct/report basis B for the $3^{rd}$ dimension. The m-th column of the DCT compression matrix is simply given by $$[W_f]_{nm} = \begin{cases} \frac{1}{\sqrt{K}}, & n = 0 \\ \sqrt{\frac{2}{K}} \cos\frac{\pi(2m+1)n}{2K}, & n = 1, K-1 \end{cases},$$

and $K=N_3$, and $m = 0, \ldots, N_3 - 1$.

Since DCT is applied to real valued coefficients, the DCT is applied to the real and imaginary components (of the channel or channel eigenvectors) separately. Alternatively, the DCT is applied to the magnitude and phase components (of the channel or channel eigenvectors) separately The use of DFT or DCT basis is for illustration purpose only. The disclosure is applicable to any other basis vectors to construct/report A and B.

The present disclosure provides a few example embodiments about quantization and reporting of coefficients $c_{l,i,k}$.

In one embodiment 0, the basis vectors $\{b_k\}$ for the third dimension correspond to at least one of the following alternatives for the domain that the basis vectors $\{b_k\}$ represent or are used to compress: for Alt 0-0, frequency (e.g. SB, RB, subcarriers); for Alt 0-1, time (e.g. delay, channel tap locations); and for Alt 0-2, frequency and time.

In the rest of the disclosure, Alt 0-0 is assumed. The embodiments of the present disclosure, however, are general, and are also applicable to other alternatives (mentioned or not mentioned in this disclosure), including Alt 0-1.

It is straightforward for the skilled-in-the-art to recognize that the notation K and M are used for illustration purpose only. They can be replaced with any other notation. In particular, the notation (K, M) can be swapped as (M, K), i.e, the notation M can be used in place of the notation K, and the notation K can be used in pace of the notation M.

In one embodiment 1, the 2LK coefficients of the $C_l$ matrix are grouped (or partitioned) into two groups (or subsets), a stronger group (S1) and a weaker group (S2), where S1 comprises $M \leq 2LK$ coefficients that are non-zero, and S2 comprises remaining $2LK-M$ coefficients that are zero. Since coefficients comprising S2 are zero, the coefficients are not reported by the UE, and only coefficients comprising S1 are reported by the UE. In an example, coefficients comprising S1 are reported as follows.

In one example, the index of the strongest of the M coefficients is reported. This requires $\lceil \log_2 M \rceil$ or $\lceil \log_2 2LK \rceil$ bits. The strongest coefficient is assumed to be 1.

In another example, the remaining $M-1$ coefficients can be normalized (divided) by the strongest coefficient. The amplitude and phase of the resultant $M-1$ coefficients are reported.

The value M is determined according to at least one of the following alternatives (Alt). In one example of Alt 1-0, M is fixed (e.g. LK). In one example of Alt 1-1, M is configured (e.g. via higher layer RRC signaling). In one example of Alt 1-2, M is reported by the UE (e.g. as part of the CSI report). In one example of Alt 1-3, $M = \lceil a \times 2LK \rceil$, where $a \leq 1$ and is according to at least one of the following sub-alternatives.

In one instance of Alt 1-3-0, a is fixed. For example, $a = \frac{1}{2}$ which implies that $M = LK$. For example, $a = 1$ which implies that $M = 2LK$. In another instance of Alt 1-3-1, a is configured via higher layer (e.g. RRC) signaling. For example, $a \in \{a_1, a_2\}$, where a few candidates for $\{a_1, a_2\}$ are $\{\frac{1}{4}, \frac{1}{2}\}$, $\{\frac{1}{3}, \frac{1}{2}\}$, and $\{\frac{1}{2}, 1\}$. In yet another instance of Alt 1-3-2, a is either fixed (Alt 1-3-0) or configurable (Alt 1-3-1) depending on at least one of parameters such as L, K, number of SBs for CQI reporting (S).

In one example of Alt 1-4, $M = \lfloor a \times 2LK \rfloor$, where $a \leq 1$ and is according to at least one of the following sub-alternatives Alt 1-3-0, Alt 1-3-1, and Alt 1-3-2.

In one example of Alt 1-5, $$M = \left\lceil \frac{1}{r} \times 2LK \right\rceil,$$

where $r \geq 1$, and is according to at least one of the following sub-alternatives.

In one instance of Alt 1-5-0, r is fixed. For example, $r = 2$ which implies that $M = LK$. For example, $r = 1$ which implies that $M = 2LK$. In another instance of Alt 1-5-1, r is configured via higher layer (e.g. RRC) signaling. For example, $r \in \{r_1, r_2\}$, where a few candidates for $\{r_1, r_2\}$ are $\{2, 4\}$, $\{2, 3\}$, and $\{1, 2\}$. In yet another instance of Alt 1-5-2, r is either fixed (Alt 1-5-0) or configurable (Alt 1-5-1) depending on at least one of parameters such as L, K, number of SBs for CQI reporting (S).

In one example of Alt 1-6, $$M = \left\lfloor \frac{1}{r} \times 2LK \right\rfloor,$$

where $r \geq 1$, and is according to at least one of the following sub-alternatives Alt 1-5-0, Alt 1-5-1, and Alt 1-5-2.

In one example of Alt 1-7, $M = 2LK$ if number of SBs for CQI reporting $S < n$, where n is a fixed number, e.g. 4, and M is according to at least one of the other alternatives, otherwise ($S > n$).

In one example of Alt 1-8, a fixed $M < 2LK$ is used if $S < n$, where n is a fixed number, and $M < 2LK$ is configured from two candidate values, otherwise ($S > n$).

In one example of Alt 1-9, $M = 2LK$ if number of SBs for PMI reporting $T < n$, where n is a fixed number, e.g. 4, and M is according to at least one of the other alternatives, otherwise ($T > n$).

In one example of Alt 1-10, a fixed $M < 2LK$ is used if $T < n$, where n is a fixed number, and $M < 2LK$ is configured from two candidate values, otherwise ($T > n$).

The notation $\lceil x \rceil$ indicates a ceiling operation on x, which corresponds (maps) to the smallest integer $\gamma$ such that $\gamma \geq x$. Likewise, the notation $\lfloor x \rfloor$ indicates a floor operation on x, which corresponds (maps) to the largest integer $\gamma$ such that $\gamma \leq x$.

In a variation, M is the maximum number of non-zero (NZ) coefficients that can be reported by the UE. The actual number of NZ coefficients, $M_1$ (comprising the stronger group (S1) can be less or equal to M, i.e., $M_1 \leq M$. The UE reports the number ($M_1$) of NZ coefficients and their indices either jointly, e.g. using a bitmap of length 2LM. Alternatively, the UE reports the value $M_1$ and the indices separately. For example, when two-part UCI is used to report the CSI, the value $M_1$ is reported in UCI part 1, and the indices of the NZ coefficients is reported using UCI part 2. For rank>1, the reporting of the value $M_1$ is according to at least one of the following alternatives.

In one example of Alt A-0, one $M_1$ value is reported for each layer independently.

In one example of Alt A-1, one $M_1$ value is reported common for all layers.

In one example of Alt A-2, one $M_1$ value is reported for each layer pair. For example, one $M_1$ value is reported for layer pair (1, 2) and another $M_1$ value is reported for layer pair (3, 4).

Likewise, for rank>1, the reporting of indices of $M_1$ NZ coefficients is according to at least one of the following alternatives.

In one example of Alt B-0, indices are reported for each layer independently.

In one example of Alt B-1, indices are reported for common for all layers.

In one example of Alt B-2, indices are reported for each layer pair independently. For example, one set of indices is reported for layer pair (1, 2) and another set of indices is reported for layer pair (3, 4).

If multiple of these alternatives are supported, then one of them is configured to the UE.

The grouping of coefficients is according to at least one of the following schemes.

In one embodiment 1A, the coefficients are grouped explicitly, e.g. using a bitmap B of length 2LK.

In example 1A-0, the bitmap $B=B_0B_1 \ldots B_{2L-1}$ is a concatenation of 2L bitmaps corresponding to the rows of the $C_l$ matrix, where the bitmap for the i-th row is $B_i = b_{i,0}b_{i,1} \ldots b_{2L-1,k}$.

In example 1A-1, the bitmap $B=B_0B_1, \ldots B_{K-1}$ is a concatenation of K bitmaps corresponding to the columns of the $C_l$ matrix, where the bitmap for the k-th column is $B_k=b_{0,k}b_{1,k} \ldots b_{2L-1,k}$.

In these examples, if a bit $b_{i,k}=0$, then the corresponding coefficient $c_{l,i,k}=0$ (hence not reported by the UE), and if a bit $b_{i,k}=1$, then the corresponding coefficient $c_{l,i,k}\neq 0$ (hence reported by the UE). Alternatively, if a bit $b_{i,k}=0$, then the corresponding coefficient $c_{l,i,k}\neq 0$ (hence reported by the UE), and if a bit $b_{i,k}=1$, then the corresponding coefficient $c_{l,i,k}=0$ (hence not reported by the UE).

The bitmap B can be layer-common, i.e., one bitmap is used in common for all layers (if rank>1). Alternatively, the bitmap is layer-specific, i.e., one bitmap is used for each layer (if rank>1). If the bitmap B is reported by the UE, then it is a part of the wideband (WB) CSI report. For example, if the CSI is reported in two parts (CSI part 1 and CSI part 2), then the bitmap B is included in the CSI part 1. Or, the bitmap B is included in the WB part of the CSI part 2.

In one embodiment 1B, the coefficients are grouped in at least one of spatial domain (or equivalently, across ports or columns of basis matrix A or indices i of $c_{l,i,k}$) or in frequency domain (or equivalently, across SBs or columns of basis matrix B or indices k of $c_{l,i,k}$). The grouping can be according to at least one of the following alternatives.

In one example of Alt 1X, independent for each coefficient in spatial domain or in frequency domain.

In one example of Alt 1Y, common for all coefficients in spatial domain or in frequency domain.

In one example of Alt 1X, for each spatial domain (beam) index $i=\{0, 1, \ldots, 2L-1\}$, the power or amplitude $p_{l,i,k}$ of coefficient $c_{l,i,k}$ for $k=0, 1, \ldots, K-1$ is partitioned (grouped) into two disjoint subsets: Q1(i): a subset of indices k in $\{0, 1, \ldots, K-1\}$ that comprise the larger power (P1) determines group S1; and Q2(i): a subset of indices k in $\{0, 1, \ldots, K-1\}$ that comprise the smaller power (P2) determines group S2.

Note that the subset Q1(i) corresponds to the T1(i) strongest coefficients/beams in the frequency domain for a given spatial domain beam i, where T1(i) is the number of coefficients in Q1(i). Likewise the subset Q2(i) corresponds to the T2(i) weakest coefficients/beams in the frequency domain, where T2(i) is the number of coefficients in Q2(i). The overall concatenated Q1 and Q2 is the given by $Q=[Q1(0) Q1(1) \ldots Q1(2L-1)]$ and $Q=[Q2(0) Q2(1) \ldots Q2(2L-1)]$.

If Q1 (or Q2) is reported by the UE, then it is a part of the wideband (WB) CSI report. For example, if the CSI is reported in two parts (CSI part 1 and CSI part 2), then the subset Q1 (or Q2) is included in the CSI part 1. Or, the subset Q1 (or Q2) is included in the WB part of the CSI part 2. Note that 2L=T1+T2. In an example, Q1 is reported using $\Sigma_{i=0}^{2L-1} B_i$ bits reporting, where $$B_i = \left\lceil \log_2 \binom{K}{T1(i)} \right\rceil$$

bits indicate the indices of coefficients in Q1(i) jointly.

In one example, the T1(i) values are fixed. In another example, the T1(i) are configured (e.g. via higher RRC signaling). In another example, the T1(i) are reported by the UE (e.g. as part of the CSI part 1). In another example, the sum $$T1 = \frac{1}{2L}\sum_{i=0}^{2L-1} T1(i)$$

is configured (e.g. via higher RRC signaling), and T1(i) for all $i=0, 1, \ldots, 2L-1$ is either fixed (pre-determined) or reported by the UE based on the configured T1 value. Also, the range of values for T1(i) includes $\{0, 1, \ldots, K\}$, where the value 0 indicates that the set Q1(i) is empty, i.e., coefficients $c_{l,i,k}=0$ for the corresponding i value, and hence not reported.

In another example of Alt 1X, for each frequency domain (beam) index $k=\{0, 1, K-1\}$, the power or amplitude $o_{l,i,k}$ of coefficient $c_{l,i,k}$ for $i=0, 1, \ldots, 2L-1$ is partitioned (grouped) into two disjoint subsets: Q1(k): a subset of indices i in $\{0, 1, \ldots, 2L-1\}$ that comprise the larger power (P1) determines group S1; and Q2(k): a subset of indices i in $\{0, 1, \ldots, 2L-1\}$ that comprise the smaller power (P2) determines group S2.

Note that the subset Q1(k) corresponds to the T1(k) strongest coefficients/beams in the spatial domain for a given frequency domain beam k, where T1 (k) is the number of coefficients in Q1(k). Likewise the subset Q2(k) corresponds to the T2(k) weakest coefficients/beams in the spatial domain, where T2(k) is the number of coefficients in Q2(k). The overall concatenated Q1 and Q2 is the given by $Q=[Q1(0) Q1(1) \ldots Q1(K-1)]$ and $Q=[Q2(0) Q2(1) \ldots Q2(K-1)]$.

If Q1 (or Q2) is reported by the UE, then it is a part of the wideband (WB) CSI report. For example, if the CSI is reported in two parts (CSI part 1 and CSI part 2), then the subset Q1 (or Q2) is included in the CSI part 1. Or, the subset Q1 (or Q2) is included in the WB part of the CSI part 2. Note that K=T1+T2. In an example, Q1 is reported using $\Sigma_{k=0}^{K-1} B_k$ bits reporting, where $$B_k = \left\lceil \log_2 \binom{2L}{T1(k)} \right\rceil$$

bits indicate the indices of coefficients in Q1(k) jointly.

In one example, the T1(k) values are fixed. In another example, the T1(k) are configured (e.g. via higher RRC signaling). In another example, the T1(k) are reported by the UE (e.g. as part of the CSI part 1). In another example, the sum $$T1 = \frac{1}{2L}\sum_{i=0}^{2L-1} T1(i)$$

is configured (e.g. via higher RRC signaling), and T1(i) for all $i=0, 1, \ldots, 2L-1$ is either fixed (pre-determined) or reported by the UE based on the configured T1 value. Also, the range of values for T1(k) includes $\{0, 1, \ldots, 2L\}$, where the value 0 indicates that the set Q1(k) is empty, i.e., coefficients $c_{l,i,k}=0$ for the corresponding k value, and hence the range of values are not reported.

For Alt 1Y, the grouping can be based on average power calculated using the coefficients. For example, to group in frequency domain, averaging is performed in spatial domain (i.e., across ports or columns of basis matrix A or indices i of $c_{l,i,k}$), and to group in spatial domain, averaging is performed in frequency domain (i.e., across SBs or columns of basis matrix B or indices k of $c_{l,i,k}$). The average power is used to group the coefficients into two groups, S1 and S2. For instance, coefficients in group S1 can correspond to the larger average power than coefficients in group S2.

In one example 1B-0, to group in frequency domain, the averaging is performed in the spatial domain (i.e., across ports or columns of basis matrix A or indices i of $c_{l,i,k}$). Let $$p_{l,k} = \frac{1}{2L}\sum_{i=0}^{2L-1}|c_{l,i,k}|^2,$$

where $|c_{l,i,k}|$ is the amplitude or absolute value of coefficient $c_{l,i,k}$. Note that $p_{l,k}$ is the average power for the k-th beam $b_k$ in frequency domain. The average power $p_{l,k}$ for k=0, 1, ..., K−1 is partitioned (grouped) into two disjoint subsets: Q1: a subset of indices k in {0, 1, ..., K−1} that comprise the larger average power (P1) determines group S1; and Q2: a subset of indices k in {0, 1, ..., K−1} that comprise the smaller average power (P2) determines group S2.

Note that the subset Q1 corresponds to the T1 strongest coefficients/beams in the frequency domain, where T1 is the number of coefficients in Q1. Likewise the subset Q2 corresponds to the T2 weakest coefficients/beams in the frequency domain, where T2 is the number of coefficients in Q2.

The subset Q1 (or Q2) can be layer-common, i.e., one subset is used in common for all layers (if rank>1). Alternatively, the subset is layer-specific, i.e., one subset is used for each layer (if rank>1). If the subset Q1 (or Q2) is reported by the UE, then it is a part of the wideband (WB) CSI report. For example, if the CSI is reported in two parts (CSI part 1 and CSI part 2), then the subset Q1 (or Q2) is included in the CSI part 1. Or, the subset Q1 (or Q2) is included in the WB part of the CSI part 2.

Note that K=T1+T2. In an example, Q1 is reported using the $1^{st}$ PMI $i_1$ according to at least one of the following alternatives.

In one example of Alt 1B-0-0, Q1 is reported using a bitmap B=$b_0 b_1 \ldots b_{K-1}$ of length K, where $b_k=0$ indicates that k belongs to Q1, or $b_k=1$ indicates that k belongs to Q1.

In one example of Alt 1B-0-1, Q1 is reported using $$\left\lceil \log_2\binom{K}{T1} \right\rceil$$

bits which indicates the indices in Q1 jointly.

Figure 14:
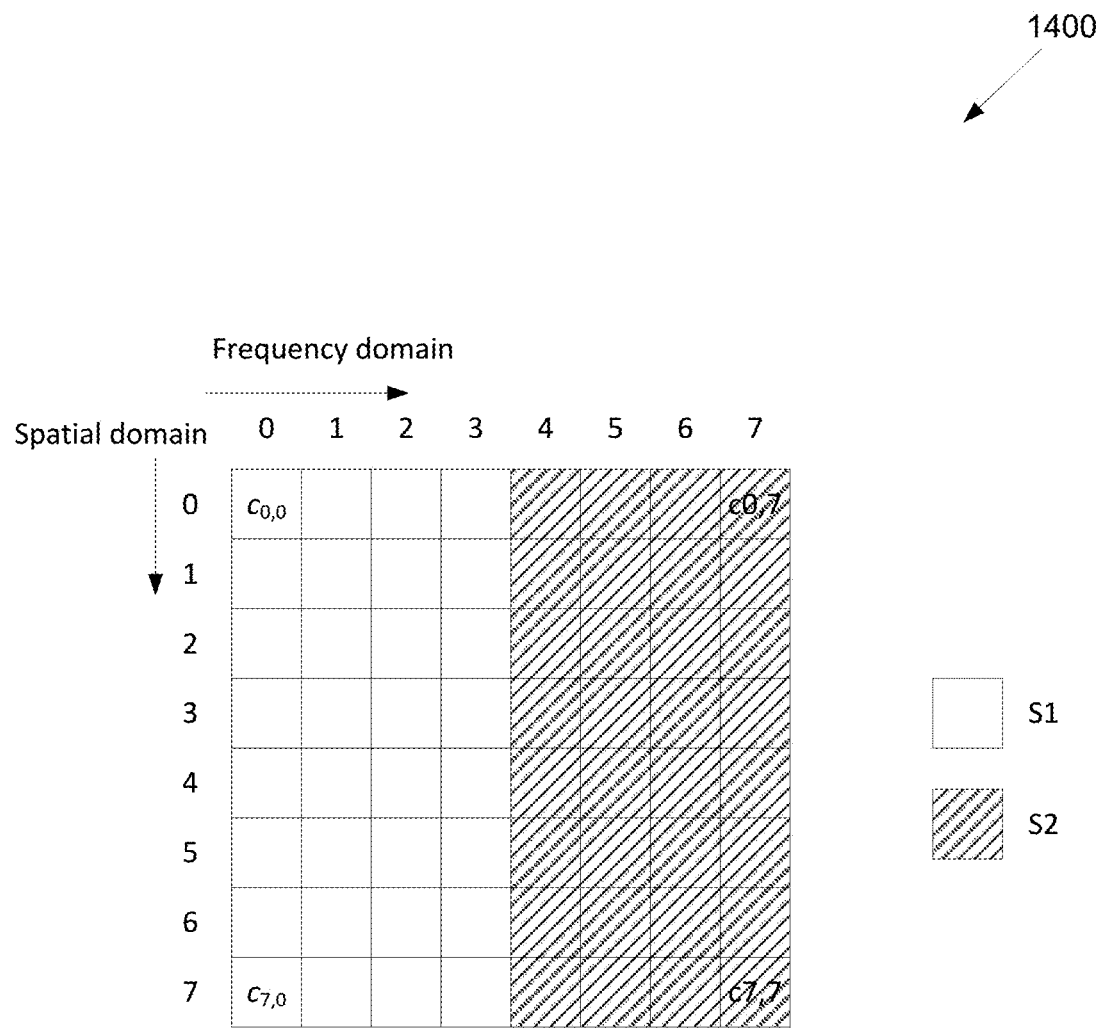
FIG. 14 illustrates an example grouping in frequency domain based on average power in spatial domain according to embodiments of the present disclosure.

FIG. 14 illustrates an example average power 1400 in spatial domain according to embodiments of the present disclosure. The embodiment of the average power 1400 illustrated in FIG. 14 is for illustration only. FIG. 14 does not limit the scope of this disclosure to any particular implementation.

An example is illustrated in FIG. 14 in which L=4, K=8, and group S1 comprises coefficients $c_{l,i,k}$, where i=0, 1, ..., 7 and k belongs to Q1={0, 1, 2, 3}, that correspond to the larger average power P1=$\Sigma_{k=0}^{3} p_{l,k}$, and group S2 comprises coefficients $c_{l,i,k}$, where i=0, 1, ..., 7 and k belongs to Q2=14, 5, 6, 71, that correspond to the smaller average P2=$\Sigma_{k=4}^{7} p_{l,k}$. In the figure, it is assumed that coefficients are sorted according to the two groups in frequency domain.

In one example 1B-1, to group in spatial domain, the averaging is performed in the frequency domain (i.e., across SBs or columns of basis matrix B or indices K of $c_{l,i,k}$). Let $$p_{l,i} = \frac{1}{K}\sum_{k=0}^{K-1}|c_{l,i,k}|^2.$$

Note that $p_{l,i}$ is the average power for the i-th beam $a_i$ in spatial domain. The average power $p_{l,i}$ for i=0, 1, ..., 2L−1 is partitioned (grouped) into two disjoint subsets: Q1: a subset of indices i in {0, 1, ..., 2L−1} that comprise the larger average power (P1) determines group S1; and Q2: a subset of indices i in {0, 1, ..., 2L−1} that comprise the smaller average power (P2) determines group S2.

Note that the subset Q1 corresponds to the T1 strongest coefficients/beams in the spatial domain, where T1 is the number of coefficients in Q1. Likewise the subset Q2 corresponds to the T2 weakest coefficients/beams in the spatial domain, where T2 is the number of coefficients in Q2.

The subset Q1 (or Q2) can be layer-common, i.e., one subset is used in common for all layers (if rank>1). Alternatively, the subset is layer-specific, i.e., one subset is used for each layer (if rank>1). If the subset Q1 (or Q2) is reported by the UE, then it is a part of the wideband (WB) CSI report. For example, if the CSI is reported in two parts (CSI part 1 and CSI part 2), then the subset Q1 (or Q2) is included in the CSI part 1. Or, the subset Q1 (or Q2) is included in the WB part of the CSI part 2.

Note that 2L=T1+T2. In an example, Q1 is reported using the $1^{st}$ PMI $i_1$ according to at least one of the following alternatives.

In one example of Alt 1B-1-0, Q1 is reported using a bitmap B=$b_0 b_1 \ldots b_{2L-1}$ of length 2L, where $b_i=0$ indicates that i belongs to Q1, or $b_i=1$ indicates that i belongs to Q1.

In one example of Alt 1B-1-1, Q1 is reported using $$\left\lceil \log_2\binom{2L}{T1} \right\rceil$$

bits which indicates the indices in Q1 jointly.

Figure 15:
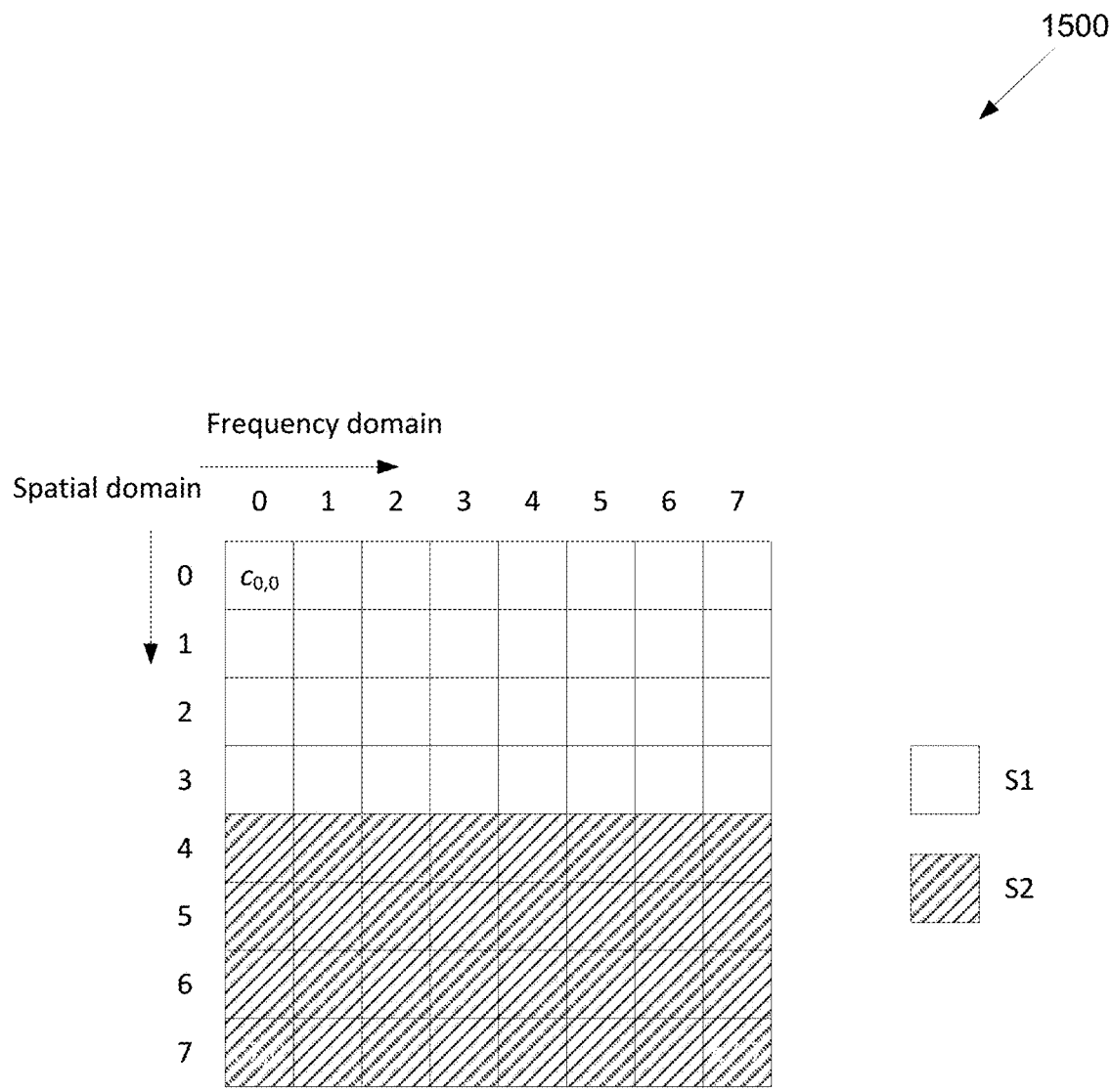
FIG. 15 illustrates an example grouping in spatial domain based on average power in frequency domain according to embodiments of the present disclosure.

FIG. 15 illustrates an example average power 1500 in spatial and frequency domain according to embodiments of the present disclosure. The embodiment of the average power 1500 illustrated in FIG. 15 is for illustration only. FIG. 15 does not limit the scope of this disclosure to any particular implementation.

An example is illustrated in FIG. 15 in which L=4, K=8, and group S1 comprises coefficients $c_{l,i,k}$, where k=0, 1, ..., 7 and i belongs to Q1={0, 1, 2, 3}, that correspond to the larger average power P1=$\Sigma_{i=0}^{3} p_{l,i}$, and group S2 comprises coefficients $c_{l,i,k}$, where k=0, 1, ..., 7 and i belongs to Q2={4, 5, 6, 7}, that correspond to the smaller average P2=$\Sigma_{i=4}^{7} p_{l,i}$. In FIG. 15, it is assumed that coefficients are sorted according to the two groups in spatial domain.

In one example 1B-2, to group in both spatial and frequency domains, the averaging is performed separately in both the spatial domain (i.e., across ports or columns of basis matrix A or indices i of $c_{l,i,k}$) and the frequency domain (i.e., across SBs or columns of basis matrix B or indices k of $c_{l,i,k}$). Let $$p_{l,k} = \frac{1}{2L}\sum_{i=0}^{2L-1}|c_{l,i,k}|^2 \text{ and } p_{l,i} = \frac{1}{K}\sum_{k=0}^{K-1}|c_{l,i,k}|^2.$$

The average power $p_{l,i}$ for i=0, 1, ..., 2L−1 is partitioned (grouped) into two disjoint subsets.

In one example for Q1, a subset of indices i in {0, 1, . . . , 2L−1} that comprise the larger average power (P11) determines sub-group (S11) of coefficients.

In one example for Q2, a subset of indices i in {0, 1, . . . , 2L−1} that comprise the smaller average power (P12) determines sub-group (S12) of coefficients.

Likewise, the average power $p_{l,k}$ for k=0, 1, . . . , K−1 is partitioned (grouped) into two disjoint subsets: R1: a subset of indices k in {0, 1 . . . , K−1} that comprise the larger average power (P21) determines sub-group (S21) of coefficients, and R2: a subset of indices k in {0, 1, . . . , K−1} that comprise the smaller average power (P22) determines sub-group (S22) of coefficients. The two groups (S1 and S2) of coefficients are then constructed from sub-groups (S11, S12, S21, and S22) of coefficients. At least one of the following alternatives is used.

In one example of Alt 1B-2-0, S1=S11 ∪S21 (i.e. S1 is a union of coefficients in sub-groups S11 and S21, or coefficients that are present in at least one of S11 and S21) and S2=S12 ∩ S22 (i.e. S2 is an intersection of coefficients in sub-groups S12 and S22, or coefficients that are present in both S12 and S22).

In one example of Alt 1B-2-1, S1=S11 ∩S21 (i.e. S1 is an intersection of coefficients in sub-groups S11 and S21, or coefficients that are present in both S11 and S21) and S2=S12 ∩S22 (i.e. S2 is a union of coefficients in sub-groups S12 and S22, coefficients that are present in at least one of S12 and S22).

Note that the subset Q1 and R1 correspond to the T1 and U1 strongest coefficients/beams in the spatial and frequency domain, respectively, where T1 and U1 respectively are the number of coefficients in Q1 and R1. Likewise the subset Q2 and R2 correspond to the T2 and U2 weakest coefficients/beams in the spatial domain and frequency domain, respectively, where T2 and U2 respectively are the number of coefficients in Q2 and R2.

The subset Q1 and R1 (or, Q2 and R2) can be layer-common, i.e., one subset is used in common for all layers (if rank>1). Alternatively, the subset is layer-specific, i.e., one subset is used for each layer (if rank>1). If the subset Q1 and R1 (or, Q2 and R2) is reported by the UE, then it is a part of the wideband (WB) CSI report.

For example, if the CSI is reported in two parts (CSI part 1 and CSI part 2), then the subset Q1 and R1 (or, Q2 and R2) is included in the CSI part 1. Or, the subset Q1 and R1 (or, Q2 and R2) is included in the WB part of the CSI part 2. Note that 2L=T1+T2, K=U1+U2. In an example, Q1 and R1 are reported using the $1^{st}$ PMI $i_1$ either separately or jointly according to at least one of the following alternatives.

In one example of Alt 1B-2-2, Q1 and R1 are reported using a bitmap B=$B_1B_2$, where: the bitmap $B_1$=$b_0b_1 \ldots b_{2L-1}$ is of length 2L, where $b_i$=0 indicates that i belongs to Q1, or $b_i$=1 indicates that i belongs to Q1; and the bitmap $B_2$= $b_0b_1 \ldots b_{K-1}$ is of length K, where $b_k$=0 indicates that k belongs to R1, or $b_k$=1 indicates that k belongs to R1.

In one example of Alt 1B-2-3, Q1 and R1 are reported using a bitmap B=$B_1B_2$, where: the bitmap $B_2$=$b_0b_1 \ldots b_{2L-1}$ is of length 2L, where $b_i$=0 indicates that i belongs to Q1, or $b_i$=1 indicates that i belongs to Q1; and the bitmap $B_1$= $b_0b_1 \ldots b_{K-1}$ is of length K, where $b_k$=0 indicates that k belongs to R1, or $b_k$=1 indicates that k belongs to R1.

In one example of Alt 1B-2-4, Q1 and R1 are reported separately using $$\left\lceil \log_2\binom{2L}{T1} \right\rceil \text{ and } \left\lceil \log_2\binom{K}{U1} \right\rceil$$

bits which respectively indicate the indices in Q1 and R1 jointly.

In one example of Alt 1B-2-5, Q1 and R1 are reported jointly using $$\left\lceil \log_2\binom{2LK}{T1U1} \right\rceil$$

bits which indicates the indices in Q1 and R1 jointly.

Figure 16:
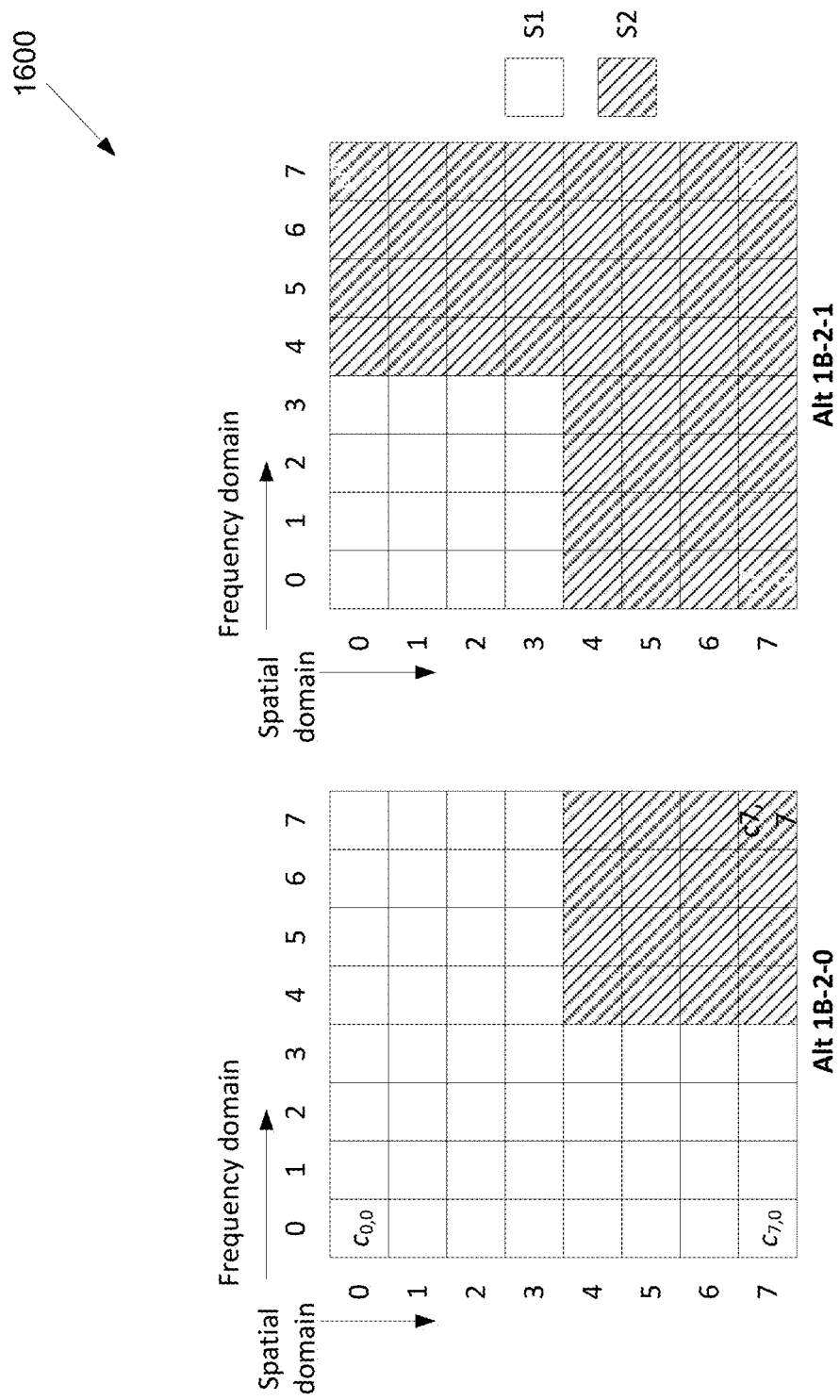
FIG. 16 illustrates another example grouping in spatial and frequency domain based on average power in spatial and frequency domain according to embodiments of the present disclosure.

FIG. 16 illustrates another example average power 1600 in spatial and frequency domain according to embodiments of the present disclosure. The embodiment of the average power 1600 illustrated in FIG. 16 is for illustration only. FIG. 16 does not limit the scope of this disclosure to any particular implementation.

An example is illustrated in FIG. 16 in which L=4, K=8, and sub-group S11, S12, S21, and S22 comprise coefficients $c_{l,i,k}$, $c_{l,i+4,k}$, $c_{l,i,k+4}$, and $c_{l,i+4,k+4}$, where i belongs to Q1={0, 1, 2, 3} and k belongs to R1={0, 1, 2, 3}. In FIG. 16, it is assumed that coefficients are sorted according to the two sub-groups in each of spatial and frequency domains.

In one example 1B-3, to group in both spatial and frequency domains, the averaging is performed separately in both the spatial domain (i.e., across ports or columns of basis matrix A or indices i of $c_{l,i,k}$) and the frequency domain (i.e., across SBs or columns of basis matrix B or indices k of $c_{l,i,k}$). Let $$p_{l,k} = \frac{1}{2L}\sum_{i=0}^{2L-1}|c_{l,i,k}|^2 \text{ and } p_{l,i} = \frac{1}{K}\sum_{k=0}^{K-1}|c_{l,i,k}|^2.$$

The average power $p_{l,i}$ for i=0, 1, . . . , 2L−1 is used to partition (group) coefficients into four disjoint subsets. In one example for Q1, a subset of indices i in {0, 1, . . . 2L−1} that comprise the first largest average power (P11) determines sub-group (S11) of coefficients. In one example for Q2, a subset of indices i in {0, 1, . . . , 2L−1} that comprise the second largest average power (P12) determines sub-group (S12) of coefficients. In one example for Q3, a subset of indices i in {0, 1, . . . 2L−1} that comprise the third largest average power (P13) determines sub-group (S13) of coefficients. In one example for Q4, a subset of indices i in {0, 1, . . . , 2L−1} that comprise the smallest average power (P14) determines sub-group (S14) of coefficients.

Likewise, the average power $p_{l,k}$ for k=0, 1, . . . , K−1 is used to partition (group) coefficients into four disjoint subsets.

In one example for R1, a subset of indices k in {0, 1, . . . , K−1} that comprise the first largest average power (P21) determines sub-group (S21) of coefficients.

In one example for R2, a subset of indices k in {0, 1, . . . , K−1} that comprise the second largest average power (P22) determines sub-group (S21) of coefficients.

In one example for R3, a subset of indices k in {0, 1, . . . , K−1} that comprise the third largest average power (P23) determines sub-group (S23) of coefficients.

In one example for R4, a subset of indices k in {0, 1, . . . , K−1} that comprise the smallest average power (P24) determines sub-group (S24) of coefficients.

The two groups (S1 and S2) of coefficients are then constructed from sub-groups (S11, S12, S13, S14, S21, S22, S23, and S24) of coefficients. For example, S1=(S11 ∪S21) ∪(S12 ∩S22) ∪(S12 ∩S23) ∪(S13 ∩S22), and S2=(S12 ∩S24) ∪(S13 ∩S23) ∪(S13 ∩S24) ∪(S14 ∩S22) ∪(S14 ∩S23) ∪(S14 ∩S24).

Figure 17:
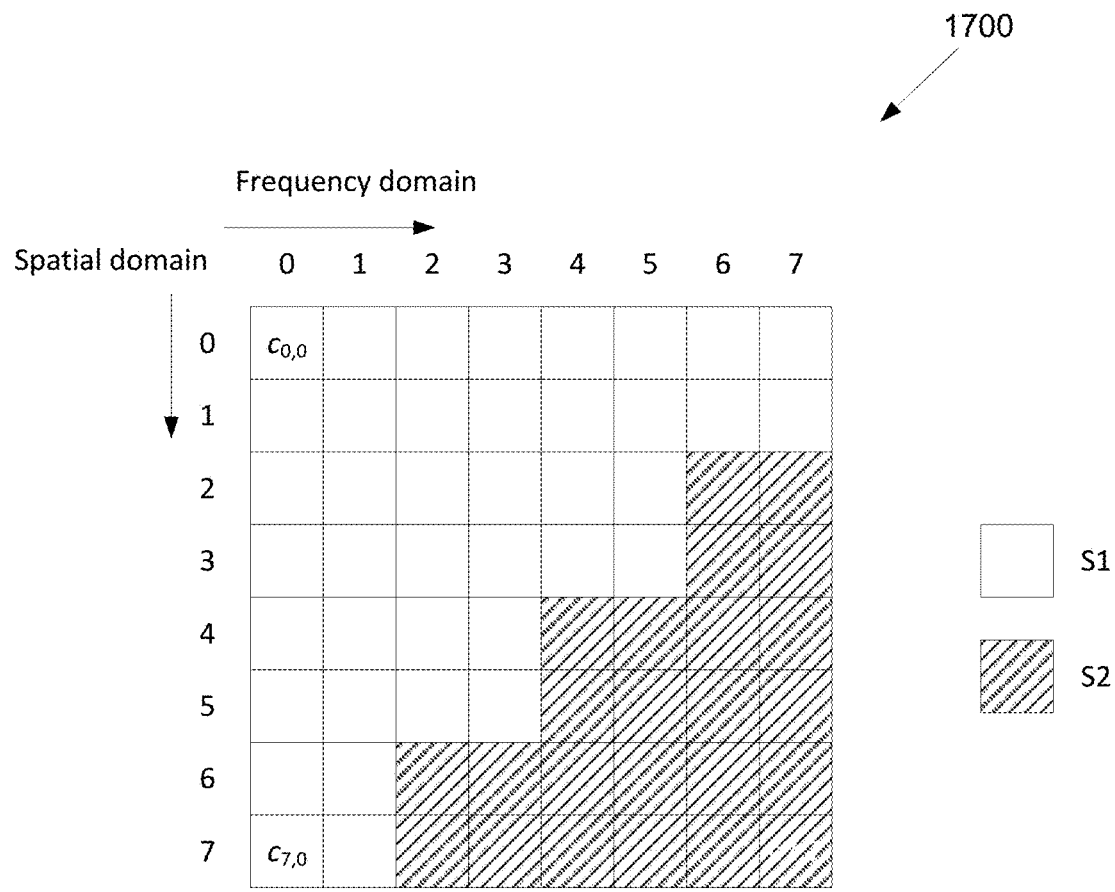
FIG. 17 illustrates yet another example grouping in spatial and frequency domain based on average power in spatial and frequency domain according to embodiments of the present disclosure.

FIG. 17 illustrates yet another example average power 1700 in spatial and frequency domain according to embodiments of the present disclosure. The embodiment of the average power 1700 illustrated in FIG. 17 is for illustration only. FIG. 17 does not limit the scope of this disclosure to any particular implementation.

This is illustrated in FIG. 17 in which L=4, K=8. In the figure, it is assumed that coefficients are sorted according to the four sub-groups in each of spatial and frequency domains.

Note that the subsets Qi and Rk, where i, k=1, 2, 3, 4, correspond to i-th and k-th sub-groups comprising T1 and Uk strongest coefficients/beams in the spatial and frequency domain, respectively, where T1 and Uk respectively are the number of coefficients in Qi and Rk.

The subsets Q1, Q2, Q3, R1, R2, and R3 (note that Q4 and R4 need not be reported) can be layer-common, i.e., the subsets Q1, Q2, Q3, R1, R2, and R3 are used in common for all layers (if rank>1). Alternatively, the subsets are layer-specific, i.e., the subsets are determined for each layer (if rank>1). If the subset Q1, Q2, Q3, R1, R2, and R3 are reported by the UE, then it is a part of the wideband (WB) CSI report. For example, if the CSI is reported in two parts (CSI part 1 and CSI part 2), then the subsets Q1, Q2, Q3, R1, R2, and R3 are included in the CSI part 1. Or, the subsets Q1, Q2, Q3, R1, R2, and R3 are included in the WB part of the CSI part 2. Note that 2L=T1+T2, K=U1+U2. In an example, the subsets Q1, Q2, Q3, R1, R2, and R3 are reported using the $1^{st}$ PMI $i_1$ either separately or jointly according to at least one of the following alternatives.

In one example of Alt 1B-3-0, Q1, Q2, Q3, R1, R2, and R3 are reported using a bitmap $B=B_1B_2$, where: the bitmap $B_1=b_0b_1 \ldots b_{4L-1}$ is of length 4L, where for all i=0, 2, 4, ..., if $b_ib_{i+1}$=00 then i/2 belongs to Q1, $b_ib_{i+1}$=01 then i/2 belongs to Q2, $b_ib_{i+1}$=10 then i/2 belongs to Q3, and $b_ib_{i+1}$=11 then i/2 belongs to Q4; and the bitmap $B_2=b_0b_1 \ldots b_{2K-1}$ is of length 2K, where for all k=0, 2, 4, ..., if $b_kb_{k+1}$=00 then k/2 belongs to R1, $b_kb_{k+1}$=01 then k/2 belongs to R2, $b_kb_{k+1}$=10 then k/2 belongs to R3, and $b_kb_{k+1}$=11 then k/2 belongs to R4.

In one example of Alt 1B-3-1, Q1, Q2, Q3, R1, R2, and R3 are reported using a bitmap $B=B_1B_2$, where $B_1$ and $B_2$ correspond to $B_2$ and $B_1$, respectively in Alt 1B-3-1.

In one example of Alt 1B-3-2, Q1, Q2, Q3, R1, R2, and R3 are reported separately using $$\left\lceil \log_2 \binom{2L}{T1}\binom{2L-T1}{T2}\binom{2L-T1-T2}{T3} \right\rceil$$

and $\left\lceil \log_2 \binom{K}{U1}\binom{K-U1}{U2}\binom{K-U1-U2}{U3} \right\rceil$ bits which respectively indicate the indices in Q1, Q2, Q3, R1, R2, and R3 jointly.

In one example of Alt 1B-3-3, Q1, Q2, Q3, R1, R2, and R3 are reported jointly using $$\left\lceil \log_2 \binom{2L}{T1}\binom{2L-T1}{T2}\binom{2L-T1-T2}{T3}\binom{K}{U1}\binom{K-U1}{U2}\binom{K-U1-U2}{U3} \right\rceil$$

bits which indicates the indices in Q1, Q2, Q3, R1, R2, and R3 jointly.

In one example 1B-4, to group in both spatial and frequency domains, the averaging is performed separately in both the spatial domain (i.e., across ports or columns of basis matrix A or indices i of $c_{l,i,k}$) and the frequency domain (i.e., across SBs or columns of basis matrix B or indices k of $c_{l,i,k}$). Let $$p_{l,k} = \frac{1}{2L}\Sigma_{i=0}^{2L-1}|c_{l,i,k}|^2 \text{ and } p_{l,i} = \frac{1}{K}\Sigma_{k=0}^{K-1}|c_{l,i,k}|^2.$$

The average power $p_{l,i}$ for i=0, 1, ..., 2L−1 is used to sort coefficients in descending or non-increasing order in spatial domain. Likewise, the average power $p_{l,k}$ for k=0, 1, ..., K−1 is used to sort coefficients in descending or non-increasing order in frequency domain.

Let: $Q=q_0, q_1, \ldots q_{2L-1}$ be a sequence of indices i that sorts the average power $p_{l,i}$ in spatial domain, i.e., $p_{l,q_m} \geq p_{l,q_n}$ for all m<n and m and n in {0, 1, ..., 2L−1}; and $R= r_0, r_1, \ldots r_{k-1}$ be a sequence of indices k that sorts the average power $p_{l,k}$ in frequency domain, i.e., $p_{l,r_m} \geq p_{l,r_n}$ for all m<n and m and n in {0, 1, ..., K−1}.

The sorted index sets Q and R can be layer-common, i.e., the sorted index sets Q and R are used in common for all layers (if rank>1). Alternatively, the sorted index sets Q and R are layer-specific, i.e., Q and R are determined for each layer (if rank>1). If Q and R are reported by the UE, then it is a part of the wideband (WB) CSI report. For example, if the CSI is reported in two parts (CSI part 1 and CSI part 2), then Q and R are included in the CSI part 1. Or, Q and R are included in the WB part of the CSI part 2. In an example, Q and R are reported using the $1^{st}$ PMI $i_1$ either separately or jointly according to at least one of the following alternatives.

In one example of Alt 1B-4-0, Q and R are reported separately using $\lceil \log_2 (2L)! \rceil$ and $\lceil \log_2 (K)! \rceil$ bits, where the factorial of a number n is given by n!=n×(n−1)×(n−2) ... 2×1.

In one example of Alt 1B-4-1, Q and R are reported jointly using $\lceil \log_2 (2L)! \times (K)! \rceil$ bits.

The two groups (S1 and S2) of coefficients are then constructed using Q and R. At least one of the following examples is used.

In one example of Ex 1B-4-0, S1 comprises all sorted coefficients $c_{l,q_ir_k}$ that satisfy i+k<α, where α is an integer between 0 and 2L+K−2.

In one example of Ex 1B-4-1, S1 comprises all sorted coefficients $c_{l,q_ir_k}$ that satisfy i+k≤α, where α is an integer between 0 and 2L+K−2.

In one example of Ex 1B-4-2, S1 comprises all sorted coefficients $c_{l,q_ir_k}$ that satisfy γi+k≤α, where α is an integer between 0 and 2L+K−2 and γ>1.

In one example of Ex 1B-4-3, S1 comprises all sorted coefficients $c_{l,q_ir_k}$ that satisfy γi+k≤α, where α is an integer between 0 and 2L+K−2 and γ>1.

In one example of Ex 1B-4-4, S1 comprises all sorted coefficients $c_{l,q_ir_k}$ that satisfy γi+k<α, where α is an integer between 0 and 2L+K−2 and γ<1.

In one example of Ex 1B-4-5, S1 comprises all sorted coefficients $c_{l,q_ir_k}$ that satisfy γi+k≤α, where α is an integer between 0 and 2L+K−2 and γ<1.

The value γ is either fixed (e.g., to 1) or configured via higher layer signaling or reported by the UE. The value α is determined according to at least one of the following alternatives.

In one example of Alt 1B-4-2, α is fixed, for example to α=(L+K)/2 or (L+K)/2−1 or (L+K)/2+1.

In one example of Alt 1B-4-3, α is higher layer (e.g. RRC) configured.

In one example of Alt 1B-4-4, $\alpha$ is reported by the UE, for example as part of the WB CSI report.

In one example of Alt 1B-4-5, $\alpha$ depends on K. For example, if K<p, then $\alpha=L+K-2$; otherwise $\alpha=(L+K)/2-1$, where p is fixed number (e.g., $p=\lceil N_3/2 \rceil$ or $\lfloor N_3/2 \rfloor$).

In one example of Alt 1B-4-6, $\alpha$ depends on L. For example, if L<p, then $\alpha=L+K-2$; otherwise $\alpha=(L+K)/2-1$, where p is fixed number (e.g., p=3 or 4).

In one example of Alt 1B-4-7, $\alpha$ depends on K and L.

Figure 18:
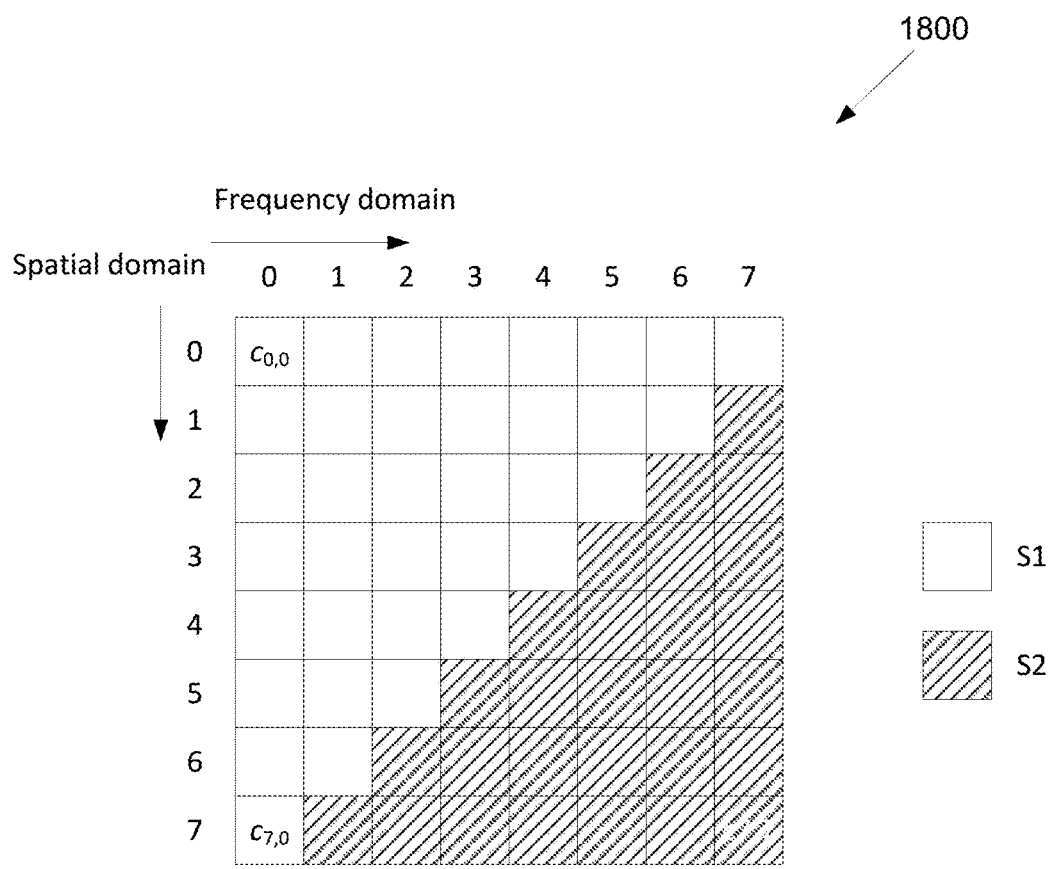
FIG. 18 illustrates yet another example grouping in spatial and frequency domain based on average power in spatial and frequency domain according to embodiments of the present disclosure.

In these example, S2 comprises the remaining sorted coefficients $c_{l,q_i,r_k}$ that do not satisfy the inequality. An example is illustrated in FIG. 18 in which L=4, K=8, and $\alpha=8$ (Ex 1B-4-0) or $\alpha=7$ (Ex 1B-4-1). In the figure, it is assumed that coefficients are sorted according to Q and R.

FIG. 18 illustrates yet another example average power 1800 in spatial and frequency domain according to embodiments of the present disclosure. The embodiment of the average power 1800 illustrated in FIG. 18 is for illustration only. FIG. 18 does not limit the scope of this disclosure to any particular implementation.

In one embodiment 2, the 2LK coefficients of the $C_l$ matrix are grouped (or partitioned) into two groups (or subsets), a stronger group (S1) whose coefficients are reported with a higher resolution (using more number of bits) and a weaker group (S2) whose coefficients are reported with a lower resolution (using less number of bits), where: S1 and S2 are determined according to one of the embodiment/alternatives/examples in embodiment 1; S1 comprises M≤2LK coefficients, each of which is reported using Z1 bits; S2 comprises remaining 2LK−M, each of which is reported using Z2 bits; Z1>Z2; and M is determined/configured/reported according to one of the alternatives in embodiment 1.

Let Z1=Z11+Z12 and Z2=Z21+Z22, where Z11 and Z21 are number of bits to report amplitude of coefficients in S1 and S2, respectively, and Z12 and Z22 are number of bits to report phase of coefficients in S1 and S2, respectively. Then, Z11, Z12, Z21, and Z22 are determined according to one of the following alternatives: Alt 2-0: Z1=6 (Z11=3, Z12=3) and Z2=5 (Z21=2, Z22=3); Alt 2-1: Z1=6 (Z11=3, Z12=3) and Z2=4 (Z21=2, Z22=2); Alt 2-2: Z1=6 (Z11=3, Z12=3) and Z2=5 (Z21=3, Z22=2); and Alt 2-2: Z1=6 (Z11=3, Z12=3) and Z2=5 (Z21=3, Z22=2).

In an example, Z1 and Z2 are fixed, for example, to Alt 2-1. In another example, Z1 and Z2 are higher layer (e.g., RRC) configured. In another example, Z1 and Z2 are reported by the UE, for example as part of the WB CSI report. In another example, Z1 and Z2 are determined based on K. In another example, Z1 and Z2 are determined based on L. In another example, Z1 and Z2 are determined based on both K and L.

In one embodiment 3, the 2LK coefficients of the $C_l$ matrix are grouped (or partitioned) into three groups (or subsets), a stronger group (S1) whose coefficients are reported with a higher resolution (using more number of bits) and a weaker group (S2) whose coefficients are reported with a lower resolution (using less number of bits), and a weakest group (S3) whose coefficients are not reported, where: S1 comprises M1≤2LK coefficients, each of which is reported using Z1 bits; S2 comprises M2≤2LK−M$_1$ coefficients, each of which is reported using Z2 bits; S3 comprises remaining 2LK−M1−M2 coefficients, which are not reported, i.e. (Z3=0); and Z1>Z2.

M1 and M2 are determined/configured/reported according to one of the alternatives for M in embodiment 1. Z1 and Z2 are determined/configured/reported according to one of the alternatives/examples in embodiment 2.

A few examples to determine S1, S2, and S3 are as follows.

In one example 3-0, the example 1B-2 is used to obtain the two subsets Q1 and Q2 in spatial domain, and the two subsets R1 and R2 in frequency domain, where the subset Q1 and R1 correspond to the T1 and U1 strongest coefficients/beams in the spatial and frequency domain, respectively. The details about Q1, Q2, R1, and R2 such as reporting/configuration are as explained in example 1B-2. The three groups (S1, S2, and S3) of coefficients are then constructed from sub-groups (S11, S12, 521, and S22) of coefficients (that are constructed as explained in example 1B-2).

For example: S1=S11∩S21 (i.e. S1 is an intersection of coefficients in sub-groups S11 and 521, or coefficients that are present in both S11 and S21); S2=(S11 ∩S22) ∩(S21 ∩S12); and S3=S12 ∩S22 (i.e. S2 is an intersection of coefficients in sub-groups S12 and S22, or coefficients that are present in both S12 and S22).

Figure 19:
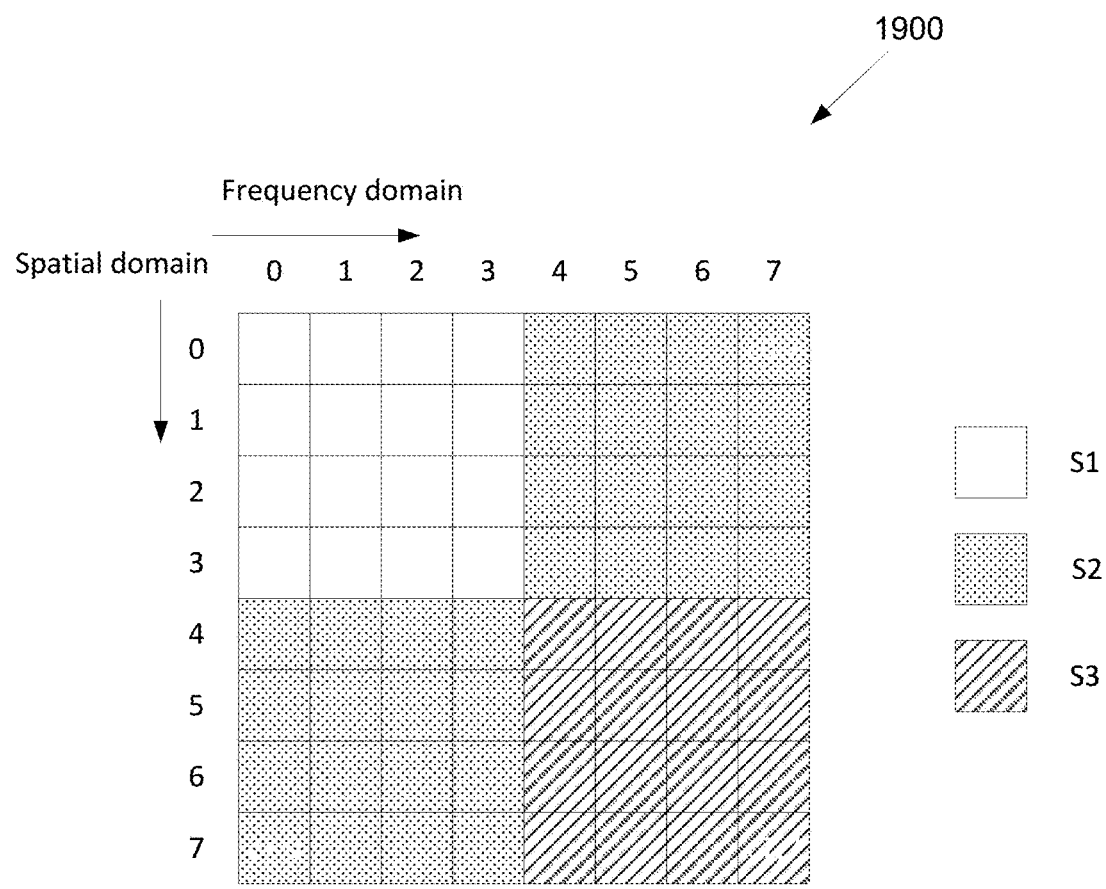
FIG. 19 illustrates yet another example grouping in spatial and frequency domain based on average power in spatial and frequency domain according to embodiments of the present disclosure.

FIG. 19 illustrates yet another example average power 1900 in spatial and frequency domain according to embodiments of the present disclosure. The embodiment of the average power 1900 illustrated in FIG. 19 is for illustration only. FIG. 19 does not limit the scope of this disclosure to any particular implementation.

An example is illustrated in FIG. 19 in which L=4, K=8, and sub-group S11, S12, S21, and S22 comprise coefficients $C_{l,i,k}$, $C_{l,i+4,k}$, $C_{l,i,k+4}$, and $C_{l,i+4,k+4}$, where i belongs to Q1={0, 1, 2, 3} and k belongs to R1={0, 1, 2, 3}. In the figure, it is assumed that coefficients are sorted according to the two sub-groups in each of spatial and frequency domains.

In one example 3-1, the example 1B-3 is used to obtain the four subsets Q1, Q2, Q3, and Q4 in spatial domain, and the four subsets R1, R2, R3, and R4 in frequency domain, where the subsets Qi and Rk, where i, k=1, 2, 3, 4, correspond to i-th and k-th sub-groups comprising Ti and Uk strongest coefficients/beams in the spatial and frequency domain, respectively, where Ti and Uk respectively are the number of coefficients in Qi and Rk. The details about Q1, Q2, Q3, Q4, R1, R2, R3, and R4 such as reporting/configuration are as explained in example 1B-3. The three groups (S1, S2, and S3) of coefficients are then constructed from sub-groups (S11, S12, S13, S14, 521, S22, S23, and S24) of coefficients (that are constructed as explained in example 1B-3).

For example: S1=(S11 ∩S21) ∩(S11 ∩S22) ∩(S11 ∩S23) ∩(S12 ∩S21) ∩(S12 ∩S22) ∩(S13 ∩S21); S2=(S11 ∩S24) ∩(S12 ∩S23) ∩(S13 ∩S22) ∩(S14 ∩S21); and S3=(S12 n S24) ∩(S13 n S23) ∩(S13 n S24) ∩(S14 n S22) ∩(S14 n S23) ∩(S14 n S24).

Figure 20:
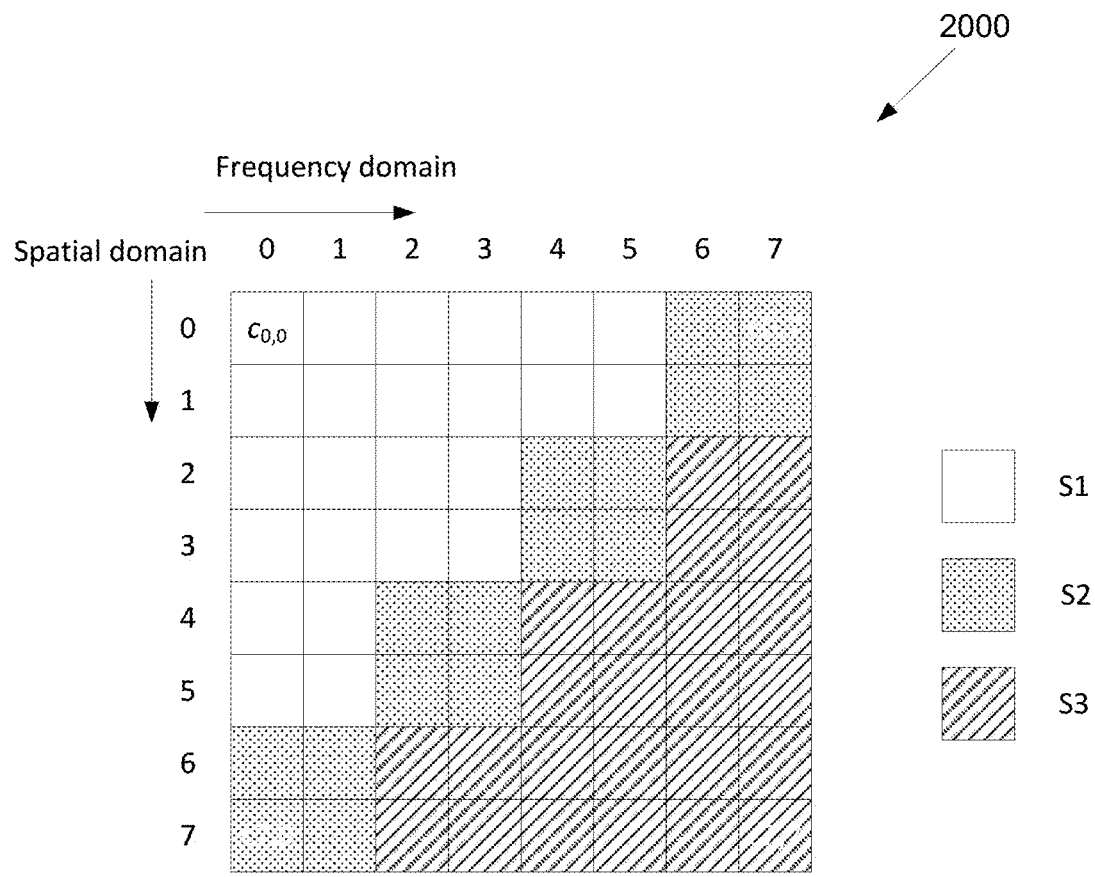
FIG. 20 illustrates yet another example grouping in spatial and frequency domain based on average power in spatial and frequency domain according to embodiments of the present disclosure.

This is illustrated in FIG. 20 in which L=4, K=8. In the figure, it is assumed that coefficients are sorted according to the four sub-groups in each of spatial and frequency domains.

FIG. 20 illustrates yet another example average power 2000 in spatial and frequency domain according to embodiments of the present disclosure. The embodiment of the average power 2000 illustrated in FIG. 20 is for illustration only. FIG. 20 does not limit the scope of this disclosure to any particular implementation.

In one example 3-2, the example 1B-4 is used to obtain the sorted index sets Q and R in spatial and frequency domains, respectively. The details about Q and R such as reporting/configuration are as explained in example 1B-4. The three groups (S1, S2, and S3) of coefficients are then constructed using Q and R.

For example: S1=(S11 ∩S21) ∩(S11 ∩S22) ∩(S11 ∩S23) ∩(S12 ∩S21) ∩(S12 ∩S22) ∩(S13 ∩S21); S2=(S11 ∩S24) ∩(S12 ∩S23) ∩(S13 ∩S22) ∩(S14 ∩S21); and S3=(S12 n S24) ∩(S13 n S23) ∩(S13 n S24) ∩(S14 n S22) ∩(S14 n S23) ∩(S14 n S24).

This is illustrated in FIG. 20 in which L=4, K=8. In the figure, it is assumed that coefficients are sorted according to the four sub-groups in each of spatial and frequency domains. At least one of the following examples is used.

In one example of Ex 3-2-0, S1 comprises all sorted coefficients $c_{l,q_i,r_k}$ that satisfy i+k<$\alpha_1$, and S2 comprises all sorted coefficients $c_{l,q_i,r_k}$ that satisfy $\alpha_1$<i+k≤$\alpha_2$ where $\alpha_1$<$\alpha_2$ are integers between 0 and 2L+K−2.

In one example of Ex 3-2-1, S1 comprises all sorted coefficients $c_{l,q_i,r_k}$ that satisfy i+k≤$\alpha_1$, and S2 comprises all sorted coefficients $c_{l,q_i,r_k}$ that satisfy $\alpha_1$<i+k≤$\alpha_2$ where $a_1$<$\alpha_2$ are integers between 0 and 2L+K−2.

In one example of Ex 3-2-2, S1 comprises all sorted coefficients $c_{l,q_i,r_k}$ that satisfy $\gamma_1$i+k<$\alpha_1$, and S2 comprises all sorted coefficients $c_{l,q_i,r_k}$ that satisfy $\alpha_1$≤$\gamma_2$i+k<$\alpha_2$ where $\alpha_1$<$\alpha_2$ are integers between 0 and 2L+K−2 and $\gamma_1$, $\gamma_{2>1}$.

In one example of Ex 3-2-3, S1 comprises all sorted coefficients $c_{l,q_i,r_k}$ that satisfy $\gamma_1$i+k≤$\alpha_1$, and S2 comprises all sorted coefficients $c_{l,q_i,r_k}$ that satisfy $\alpha_1$<$\gamma_2$i+k≤$\alpha_2$ where $\alpha_1$<$\alpha_2$ are integers between 0 and 2L+K−2 and $\gamma_1$, $\gamma_2$>1.

In one example of Ex 3-2-4, S1 comprises all sorted coefficients $c_{l,q_i,r_k}$ that satisfy $\gamma_1$i+k<$\alpha_1$, and S2 comprises all sorted coefficients $c_{l,q_i,r_k}$ that satisfy $\alpha_1$≤$\gamma_2$i+k<$\alpha_2$ where $\alpha_1$<$\alpha_2$ are integers between 0 and 2L+K−2 and $\gamma_1$, $\gamma_2$<1.

In one example of Ex 3-2-5, S1 comprises all sorted coefficients $c_{l,q_i,r_k}$ that satisfy $\gamma_1$i+k≤$\alpha_1$, and S2 comprises all sorted coefficients $c_{l,q_i,r_k}$ that satisfy $\alpha_1$<$\gamma_2$i+k≤$\alpha_2$ where $\alpha_1$<$\alpha_2$ are integers between 0 and 2L+K−2 and $\gamma_1$, $\gamma_2$<1.

In one example, $\gamma_1$=$\gamma_2$=$\gamma$. In another example, $\gamma_1$=$\gamma$ and $\gamma_2$=s$\gamma$ where s is a fixed scaling factor. In another example, $\gamma_1$ and $\gamma_2$ are determined/configured/reported independently. The value $\alpha_1$ and $\alpha_2$ are determined according to at least one of the alternatives for a in example 1B-4.

Figure 21:
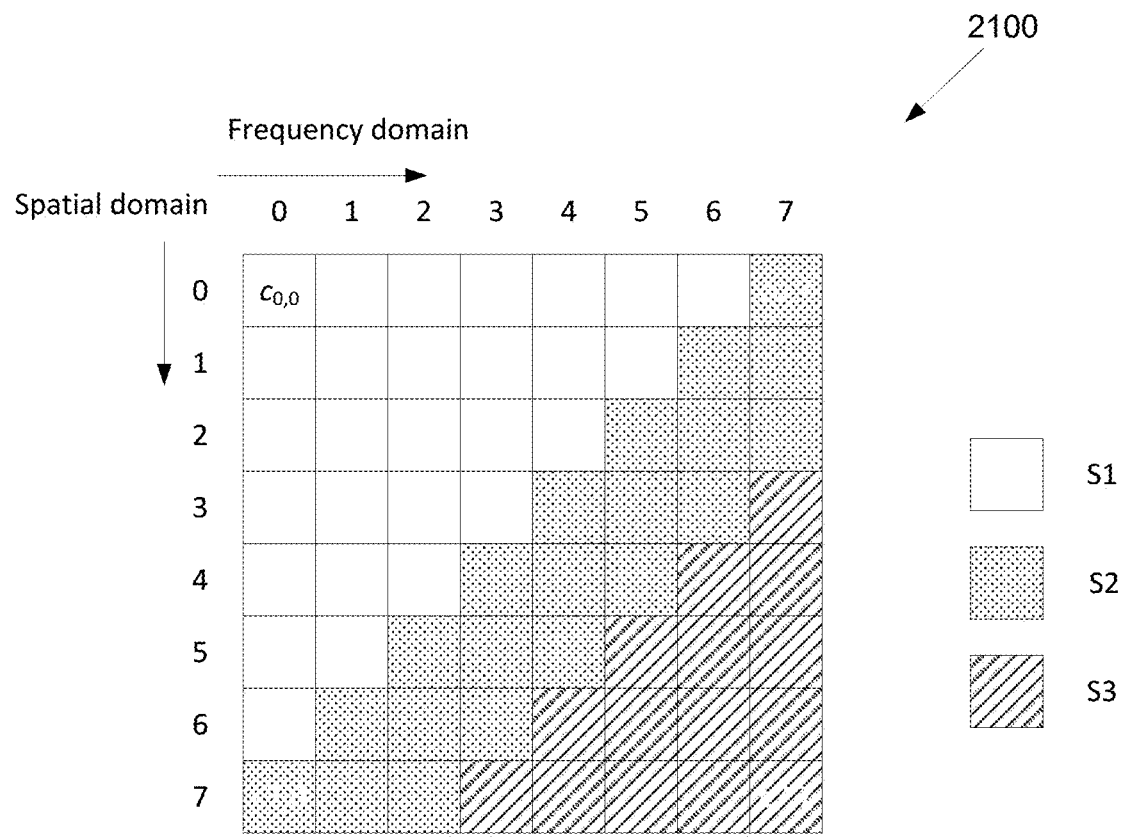
FIG. 21 illustrates yet another example grouping in spatial and frequency domain based on average power in spatial and frequency domain according to embodiments of the present disclosure.

In such examples, S3 comprises the remaining sorted coefficients $c_{l,q_i,r_k}$ that do not satisfy the inequalities. An example is illustrated in FIG. 21 in which L=4, K=8, and $\alpha_1$=8 and $\alpha_{2=11}$ (Ex 3-2-0) or $\alpha_1$=7 and $\alpha_2$=10 (Ex 3-2-1). In the figure, it is assumed that coefficients are sorted according to Q and R.

FIG. 21 illustrates yet another example average power 2100 in spatial and frequency domain according to embodiments of the present disclosure. The embodiment of the average power 2100 illustrated in FIG. 21 is for illustration only. FIG. 21 does not limit the scope of this disclosure to any particular implementation.

In one embodiment 3A, the coefficient $c_{l,i,k}$ in precoder equations Eq. 1 or Eq. 2 is replaced with $v_{l,i,k} \times c_{l,i,k}$, where $v_{l,i,k}$=1 if the coefficient $c_{l,i,k}$ is reported by the UE according to some embodiments of the present disclosure, and $v_{l,i,k}$=0 otherwise (i.e., $c_{l,i,k}$ is not reported by the UE).

The indication whether $v_{l,i,k}$=1 or 0 is according to some embodiments of the present disclosure.

In a variation of this embodiment, the precoder equations Eq. 1 or Eq. 2 are respectively generalized to $W^l = \sum_{i=0}^{L-1}\sum_{k=0}^{K_i-1} c_{l,i,k}(a_i b_{i,k}^H)$ (Eq. 3) and $$W^l = \begin{bmatrix} \sum_{i=0}^{L-1}\sum_{k=0}^{K_i-1} c_{l,i,k}(a_i b_{i,k}^H) \\ \sum_{i=0}^{L-1}\sum_{k=0}^{K_i-1} c_{l,i+L,k}(a_i b_{i,k}^H) \end{bmatrix}. \quad \text{(Eq. 4)}$$

where for a given i, the number of basis vectors is $K_i$ and the corresponding basis vectors are $\{b_{i,k}\}$. Note that $K_i$ is the number of coefficients $c_{l,i,k}$ reported by the UE for a given i.

The basis vectors $b_{i,k}$ is according to at least one of the following examples.

In one example, $b_{i,k}$=$b_k$ for all i.

In another example, $b_{i,k}$=$b_k$ for a subset A of i values. For example, A={i, i+L} where i=0, 1, . . . , L−1.

In another example, $b_{i,k}$ is independently selected for all i values.

The number of basis vectors $K_i$ is according to at least one of the following examples.

In one example, $K_i$=K for all i.

In another example, $K_i$=K for a subset A of i values. For example, A={i, i+L} where i=0, 1, . . . , L−1.

In another example, $K_i$ is independently selected for all i values.

In one embodiment 4, which is a variation of embodiment 1, a UE is configured with higher layer parameter CodebookType set to "TypeII-PortSelection-Compression" or "TypeIII-PortSelection" for an enhanced Type II CSI reporting with port selection in which the pre-coders for all SBs and for a given layer l=1, . . . , v, where v is the associated RI value, is given by either $$W^l = AC_l B^H =$$

$$[a_0\, a_1\, \ldots\, a_{L-1}]\begin{bmatrix} c_{l,0,0} & c_{l,0,1} & \cdots & c_{l,0,K-1} \\ c_{l,1,0} & c_{l,1,1} & \cdots & c_{l,1,K-1} \\ \vdots & \vdots & \vdots & \vdots \\ c_{l,L-1,0} & c_{l,L-1,1} & \cdots & c_{l,L-1,K-1} \end{bmatrix}[b_0\, b_1\, \ldots\, b_{K-1}]^H =$$

$$\sum_{k=0}^{K-1}\sum_{i=0}^{L-1} c_{l,i,k}(a_i b_k^H),$$

or $W^l = \begin{bmatrix} A & 0 \\ 0 & A \end{bmatrix} C_l B^H =$ $$\begin{bmatrix} a_0\, a_1\, \ldots\, a_{L-1} & 0 \\ 0 & a_0\, a_1\, \ldots\, a_{L-1} \end{bmatrix}\begin{bmatrix} c_{l,0,0} & c_{l,0,1} & \cdots & c_{l,0,K-1} \\ c_{l,1,0} & c_{l,1,1} & \cdots & c_{l,1,K-1} \\ \vdots & \vdots & \vdots & \vdots \\ c_{l,2L-1,0} & c_{l,2L-1,1} & \cdots & c_{l,2L-1,K-1} \end{bmatrix}$$

$$[b_0\, b_1\, \ldots\, b_{K-1}]^H = \begin{bmatrix} \sum_{k=0}^{K-1}\sum_{i=0}^{L-1} c_{l,i,k}(a_i b_k^H) \\ \sum_{k=0}^{K-1}\sum_{i=0}^{L-1} c_{l,i+L,k}(a_i b_k^H) \end{bmatrix},$$

where $N_1$, $N_2$, $N_3$, and $c_{l,i,k}$ are defined as in embodiment 1.

In addition, the UE is configured to report columns of A=[$a_0\, a_1\, \ldots\, a_{L-1}$], and B=[$b_0\, b_1\, \ldots\, b_{K-1}$] matrices in a WB manner, i.e., one A and one B are reported common for the entire CSI reporting band. For instance, the L antenna ports per polarization or column vectors of A are selected by the index $q_1$, where $$q_1 \in \left\{0, 1, \ldots, \left\lceil \frac{P_{CSI-RS}}{2d} \right\rceil - 1\right\} \text{(this requires } \left\lceil \log_2 \left\lceil \frac{P_{CSI-RS}}{2d} \right\rceil \right\rceil \text{ bits),}$$

and the value of d is configured with the higher layer parameter PortSelectionSamplingSize, where d ∈ {1,2,3,4} and $$d \leq \min\left(\frac{P_{CSI-RS}}{2}, L\right).$$

The K column vectors of B are reported jointly (which requires $$\left\lceil \log_2 \binom{N_3}{K} \right\rceil \text{ bits}).$$

In an example, to report columns of B, the oversampled DFT codebook is used. For instance, $b_k=w_k$, where the quantity $w_k$ is given by $$w_k = \begin{bmatrix} 1 & e^{j\frac{2\pi k}{O_3 N_3}} & \cdots & e^{j\frac{2\pi k(N_3-1)}{O_3 N_3}} \end{bmatrix}.$$

The value of $N_3$ is configured by configuring the Carrier bandwidth part (PRBs) and Subband size (PRBs).

The value of $O_3$ is fixed, for example to 1 or 2 or 4. To report columns of A, the port selection vectors are used, For instance, $a_i=v_m$, where the quantity $v_m$ is a $P_{CSI-RS}/2$-element column vector containing a value of 1 in element $$\left(m \bmod \frac{P_{CSI-RS}}{2}\right)$$

and zeros elsewhere (where the first element is element 0).

The coefficient matrix $C_l$ in this case is detrained and reported according to one of the embodiments/examples/alternatives in embodiments 1/2/3 of the present disclosure.

In one embodiment 5, the UE is configured/triggered to report the index set of coefficients, S1 or (S1, S2), that are reported by the UE according to some of the embodiments of this disclosure. This triggering or configuration can be aperiodic based on DCI based signaling. When triggered, the UE reports the index set S1 or (S1, S2) either alone or together with the rest of the CSI content (e.g. coefficients comprising 51). Also, for more than one layers (rank>1), the UE reports the index set according to one of the following alternatives.

In one example of Alt 5-0, the UE reports the index sets for up to R layers, where R can be fixed, e.g., to max than can be supported by the UE.

In one example of Alt 5-1, the UE reports the index sets for up to R layers, where R is the max configured, e.g. via RI restriction.

In one example of Alt 5-2, the UE reports the index sets for up to R layers, where R corresponds to the RI value reported in the last CSI report.

In one embodiment 6, the UE is configured/triggered to report a bitmap to report the indices of reported non-zero coefficients (i.e., the coefficients that are non-zero, and hence whose amplitude and phase are reported) as provided in some embodiments (embodiments 1-5) of this disclosure, where the bitmap is according to at least one of the following alternatives based on the two antenna port polarizations (assuming dual-polarized antenna ports at the gNB).

In one example of Alt 6-0, the bitmap is reported in a polarization-independent manner, i.e., the coefficients for the two polarizations are selected/reported independently, and one of the two coefficients is selected/reported independent of the other coefficient.

In one example of Ex 6-0-0, if the coefficient matrix $C_l$ comprises 2LK coefficients (e.g. 2L for spatial domain, and K for frequency domain), the bitmap of length 2LK is used to indicate the indices of non-zero coefficients. This example to similar to example 1A.

In one alternative of this example (e.g., Ex 6-0-0), the bitmap $B=B_0 B_1 \ldots B_{2L-1}$ is a concatenation of 2L bitmaps corresponding to the rows of the $C_l$ matrix, where the bitmap for the i-th row is $B_i=b_{i,0}b_{i,1} \ldots b_{i,k-1}$.

In another alternative of this example (e.g., Ex 6-0-1), the bitmap $B=B_0 B_1, \ldots B_{K-1}$ is a concatenation of K bitmaps corresponding to the columns of the $C_l$ matrix, where the bitmap for the k-th column is $B_k=b_{0,k}b_{1,k} \ldots b_{2L-1,k}$.

In these examples, if a bit $b_{i,k}=0$, then the corresponding coefficient $c_{l,i,k}=0$ (hence not reported by the UE), and if a bit $b_{i,k}=1$, then the corresponding coefficient $c_{l,i,k}\neq 0$ (hence reported by the UE). Alternatively, if a bit $b_{i,k}=0$, then the corresponding coefficient $c_{l,i,k}\neq 0$ (hence reported by the UE), and if a bit $b_{i,k}=1$, then the corresponding coefficient $c_{l,i,k}=0$ (hence not reported by the UE).

In one example of Alt 6-1, the bitmap is reported in a polarization-common manner, i.e., the coefficients for the two polarizations are selected/reported common, and either both coefficients are selected/reported or both are not selected.

In one example of Ex 6-1-0, if the coefficient matrix $C_l$ comprises 2LK coefficients (e.g. 2L for spatial domain, and K for frequency domain), the bitmap of length LK is used to indicate the indices of non-zero coefficients where each bit is common for (or associated with) two antenna polarizations.

In one alternative of this example (Ex 6-1-0), the bitmap $B=B_0 B_1 \ldots B_{L-1}$ is a concatenation of L bitmaps corresponding to the rows of the $C_l$ matrix, where the bitmap for the i-th row is $B_i=b_{i,0}b_{i,1} \ldots b_{i,k-1}$.

In another alternative of this example (Ex 6-1-1), the bitmap $B=B_0 B_1 \ldots B_{K-1}$ is a concatenation of K bitmaps corresponding to the columns of the $C_l$ matrix, where the bitmap for the k-th column is $B_k=b_{0,k}b_{1,k} b_{L-1,k}$.

In such examples, if a bit $b_{i,k}=0$, then the corresponding two coefficients are zero, i.e., $c_{l,i+L,k}=0$ and $c_{l,i,k}=0$ (hence not reported by the UE), and if a bit $b_{i,k}=1$, then the corresponding two coefficients are non-zero, i.e., $C_{l,i,k+L,k}\neq 0$ and $c_{l,i,k}\neq 0$ (hence reported by the UE). Alternatively, if a bit $b_{i,k}=0$, then the corresponding two coefficients are non-zero, i.e., $C_{l,i+L,k}\neq 0$ and $C_{l,i,k}\neq 0$ (hence reported by the UE), and if a bit $b_{i,k}=1$, then the corresponding two coefficients $C_{l,i,k+L,k}=0$ and $c_{l,i,k}=0$ (hence not reported by the UE).

The bitmap B can be layer-common, i.e., one bitmap is used in common for all layers (if rank>1). Alternatively, the bitmap is layer-specific, i.e., one bitmap is used for each layer (if rank>1). If the bitmap B is reported by the UE, then it is a part of the wideband (WB) CSI report. For example, if the CSI is reported in two parts (CSI part 1 and CSI part 2) using two-part UCI, then the bitmap B is included in the CSI part 1 (UCI part 1). Or, the bitmap B is included in the WB part of the CSI part 2 (UCI part 2).

In one example of Alt 6-2, the UE selects/reports the indices of non-zero coefficients using two components: the first component indicates a subset S1 of spatial domain (SD) beam indices (i) whose coefficients can be non-zero, where the number of SD indices in the subset S1 is L'≤L. The coefficients whose SD indices (i) are not indicated via the subset are zero; and the second component is a bitmap to indicate the indices of non-zero coefficients within the indicated subset of SD beam indices (i). The details about the bitmap is according to at least one of Alt 6-0 (polarization-independent) and Alt 6-1 (polarization-common) where the number of SD beam indices (L) is replaced with L'. Hence, the length of the bitmap is 2L'K (Alt 6-0) or L'K (Alt 6-1).

In one example of Alt 6-3, the UE selects/reports the indices of non-zero coefficients using two components: the first component indicates a subset S2 of frequency domain (FD) beam indices (k) whose coefficients can be non-zero, where the number of FD indices in the subset S2 is K'≤K. The coefficients whose FD indices (k) are not indicated via the subset are zero; and the second component is a bitmap to indicate the indices of non-zero coefficients within the indicated subset of FD beam indices (k). The details about the bitmap is according to at least one of Alt 6-0 (polarization-independent) and Alt 6-1 (polarization-common) where the number of FD beam indices (K) is replaced with K'. Hence, the length of the bitmap is 2LK' (Alt 6-0) or LK' (Alt 6-1).

In one example of Alt 6-4, the UE selects/reports the indices of non-zero coefficients using two components: the first component indicates a subset S1 of spatial domain (SD) beam indices (i) and a subset S2 of frequency domain (FD) beam indices (k) whose coefficients can be non-zero, where the number of SD indices in the subset S1 is L'≤L and the number of FD indices in the subset S2 is K'≤K. The coefficients whose SD indices (i) and FD indices (k) are not indicated via the subset are zero; and the second component is a bitmap to indicate the indices of non-zero coefficients within the indicated subset of SD beam indices (i). The details about the bitmap is according to at least one of Alt 6-0 (polarization-independent) and Alt 6-1 (polarization-common) where the number of SD beam indices (L) is replace with L' and the number of FD beam indices (K) is replaced with K'. Hence, the length of the bitmap is 2L'K' (Alt 6-0) or L'K' (Alt 6-1).

In one example of Alt 6-2 and 6-4, the reporting of the first component (S1) is either via a bitmap or a combinatorial index reporting. Also, this reporting can be free (unrestricted) from all candidate values. For example, 1≤L'≤2L (Alt 6-0) and 1≤L'≤L (Alt 6-1). Alternatively, the selection is constrained (restricted) to some values. For example, S1 ∈ {K, K+1, ..., 2L} (Alt 6-0) and S1 ∈ {K, K+1, ..., L} (Alt 6-1).

Similarly, in Alt 6-3 and 6-4, the reporting of the second component (S2) is either via a bitmap or a combinatorial index reporting. Also, this reporting can be free (unrestricted) from all candidate values. For example, 1≤K'≤K. Alternatively, the selection is constrained (restricted) to some values. For example, K=⌈p×$N_{SB}$⌉ or ⌈p×$N_3$/R⌉ where $N_{SB}$=number of SBs for CQI reporting, $N_3$=number of FD compression unit (that determines the length of FD basis vectors), R ∈ {1, 2} is the number FD compression units in each SB to report CQI, and p=a fraction which belongs to $$\left\{\frac{1}{8}, \frac{1}{4}, \frac{1}{2}, \frac{3}{4}\right\},$$

and the UE reports a p value that is less or equal to the configured p value. In one example, only two values for p is supported, e.g., $$\left\{\frac{1}{4}, \frac{1}{2}\right\} \text{ or } \left\{\frac{1}{8}, \frac{1}{4}\right\} \text{ or } \left\{\frac{1}{2}, \frac{3}{4}\right\}.$$

In Alt 6-2, 6-3, and 6-4, the first component (51 or/and S2) is can be reported separately from the second component (bitmap). For example, the first component is reported in UCI part 1 and the second component in UCI part 2. Alternatively, both components are reported together, for example, in UCI part 2.

Also, in Alt 6-0 through Alt 6-4, if the strongest coefficient is reported by the UE, then either a single strongest coefficient is reported regardless of whether coefficient reporting polarization-independent or polarization-common, or a single strongest coefficient is reported in case of polarization-independent, and two strongest coefficients, one for each polarization, are reported in case of polarization-common.

Figure 22:
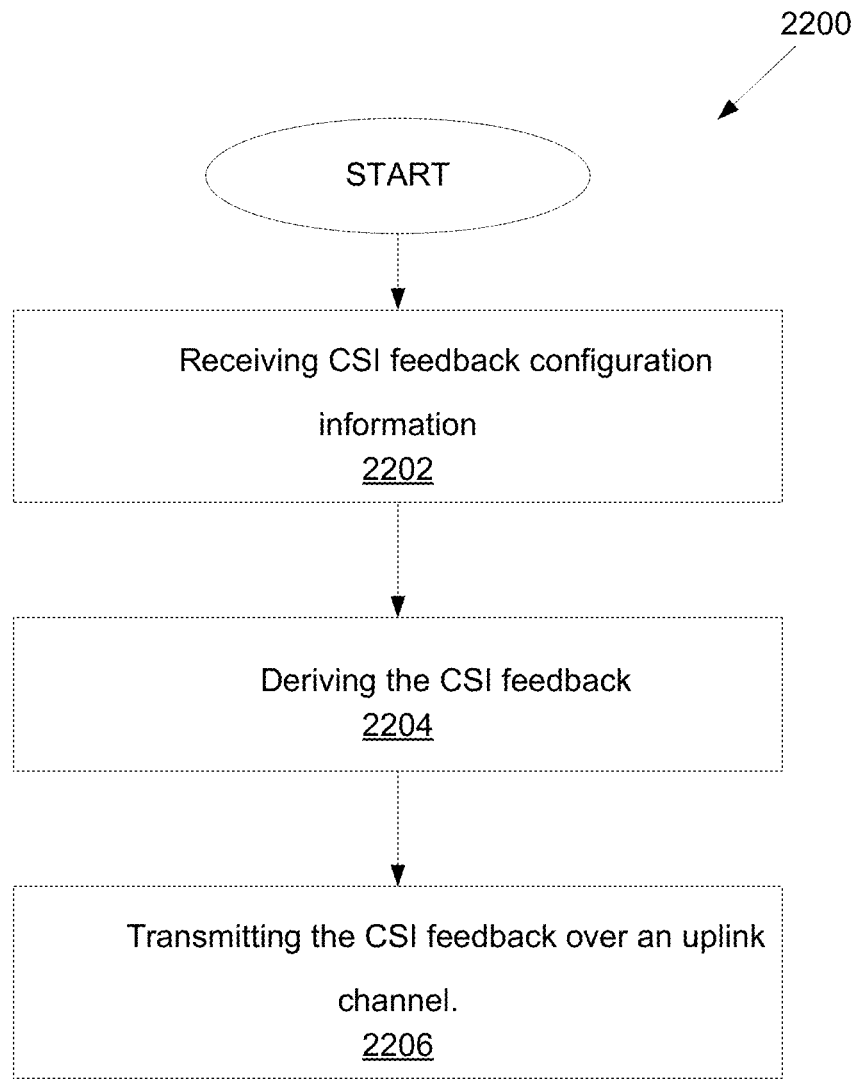
FIG. 22 illustrates a flow chart of a method for CSI feedback, as may be performed by a user equipment (UE), according to embodiments of the present disclosure.

FIG. 22 illustrates a flow chart of a method 2200 for CSI reporting, as may be performed by a user equipment (UE), according to embodiments of the present disclosure. The embodiment of the method 2200 illustrated in FIG. 22 is for illustration only. FIG. 22 does not limit the scope of this disclosure to any particular implementation.

As shown in FIG. 22, the method 2200 begins at step 2202. In step 2202, the UE (e.g., 111-116 as illustrated in FIG. 1) receives, from a base station (BS) (e.g., 101-103 as illustrated in FIG. 1), CSI feedback configuration information including a number ($K_0$) of coefficients for the CSI feedback.

In one embodiment, Q=2LM, the total of Q coefficients forms a 2L×M coefficient matrix $C_l$ comprising 2L rows and M columns, the $K_1$ coefficients correspond to non-zero coefficients of the 2L×M coefficient matrix $C_l$, and the remaining 2LM−$K_1$ coefficients of the 2L×M coefficient matrix $C_l$ are zero.

In one embodiment, the UE in step 2204 determines a number $K_1$ and transmits, to the BS, the CSI feedback including the number $K_1$.

In step, 2204, the UE derives, based on the CSI feedback configuration information, the CSI feedback including $K_1$ coefficients that are a subset of a total of Q coefficients, wherein $K_1 < K_0$ and $K_0 < Q$.

In one embodiment, the UE in step 1204 determines a bit sequence B=$b_0 b_1 \ldots b_{2LM-1}$ comprising 2LM bits to indicate indices of the $K_1$ coefficient; and transmits, to the BS, the CSI feedback including the bit sequence B, where the bit sequence B comprises $K_1$ ones and 2LM−$K_1$ zeros, and an i-th bit $b_i$ of the bit sequence B is set to one when an i-th coefficient of the total of 2LM coefficients is included in the $K_1$ coefficients.

In such embodiment, the $K_0$ is determined as $K_0$=⌈a× 2LM⌉ where a≤1, an a is configured via higher layer signaling, and the a is configured from a set of values including {¼, ½}.

In such embodiment, the CSI feedback includes a precoding matrix indicator (PMI) indicating the 2L× M coefficient matrix $C_l$, a spatial domain (SD) basis matrix $A_l$ and a frequency domain (FD) basis matrix $B_l$ for each l=1, ..., v.

In such embodiment 1 is a layer index with a range of l=1, ..., v, v is an associated rank indicator (RI) value, a precoding matrix for each FD unit of a total number ($N_3$) of FD units is determined by columns of $$W = \frac{2}{\sqrt{v}} [W^1 \ W^2 \ \ldots \ W^v]$$

where $$W^l = \begin{bmatrix} A_l & 0 \\ 0 & A_l \end{bmatrix} C_l B_l^H = \begin{bmatrix} \sum_{k=0}^{M-1} \sum_{i=0}^{L-1} c_{l,i,k}(a_{l,i} b_{l,k}^H) \\ \sum_{k=0}^{M-1} \sum_{i=0}^{L-1} c_{l,i+L,k}(a_{l,i} b_{l,k}^H) \end{bmatrix},$$

$A_l = [a_{l,0}\ a_{l,1}\ \ldots\ a_{l,L-1}]$, $a_{l,i}$ is a $N_1 N_2 \times 1$ column vector for SD antenna ports where $N_1$ and $N_2$ are number of antenna ports, respectively, with a same antenna polarization in a first and a second dimensions of a two-dimensional dual-polarized channel state information-reference signal (CSI-RS) antenna ports at the BS; $B_l = [b_{l,0}\ b_{l,1}\ \ldots\ b_{l,M-1}]$, $b_{l,k}$ is a $N_3 \times 1$ column vector for FD units; $C_l$ is a $2L \times M$ matrix comprising coefficients $c_{l,i,k}$; and a number (L) of column vectors for the SD antenna ports, a number (M) of column vectors for the FD units, and the total number ($N_3$) of the FD units are configured via higher layer signaling.

In step 2206, the UE transmits, to the BS, the CSI feedback including the $K_1$ coefficients over an uplink channel.

In one embodiment 21, a UE is configured (e.g. via higher layer RRC signaling) or triggered (e.g. via DCI signaling) to report 'explicit CSI' representing a three-dimensional (3D) $M \times N \times K$ matrix $H_{M,N,K}$, where M=number of receive (Rx) components at the UE that comprises a first dimension of the matrix $H_{M,N,K}$; N=number of transmit (Tx) components at the gNB that comprises a second dimension of the matrix $H_{M,N,K}$; and K=number of frequency components that comprises a third dimension of the matrix $H_{M,N,K}$.

Note that all embodiments of the present disclosure are applicable to other 3D matrices that are obtained by permuting the three dimensions of the matrix $H_{M,N,K}$. Two examples of such permutations are a $N \times M \times K$ matrix $H_{N,M,K}$ and a $N \times K \times M$ matrix $H_{N,K,M}$.

In one example of Rx components, M=number of Rx antenna (ports) at the UE, and the matrix $H_{M,N,K}$ corresponds to the DL channel. In another example, M=number of layers (i.e., rank), and the matrix $H_{M,N,K}$ corresponds to the eigenvectors of the DL channel (where the eigenvector in the 2$^{nd}$ dimension, i.e., $H_{M,N,K}$ (m,k) is an m-th eigenvector at the k-th frequency component).

In one example of Tx components, $N=2N_1 N_2$ is the number of Tx antenna ports at the gNB, where $N_1$ and $N_2$ are as illustrated in FIG. 12.

In one example of frequency components, K=number of SBs (that are configured for CSI reporting). In another example, K=number of PRBs (that are configured for CSI reporting). In another example, K=k×number of PRBs (that are configured for CSI reporting), where k is fixed, for example k=2 or k depends on the CSI-RS density (i.e., #REs/port/PRB) or k=number of subcarriers per PRB. In another example, K is configured via higher layer (e.g., RRC).

If M=1, then the 3D matrix $H_{M,N,K}$ reduces to a two-dimensional (2D) $N \times K$ matrix $H_{N,K}$, which is represented as a weighted (linear) sum of d outer product matrices ($Z_i = u_i v_i^H$), i.e., $H_{N,K} \cong \sum_{i=0}^{d-1} \sigma_i Z_i$, where: $\sigma_i$ is a non-negative real number; $u_i$ is a $N \times 1$ column vector; and $v_i$ is a $K \times 1$ column vector.

The value d belongs to $\{1, 2, \ldots, \min(N,K)\}$ and is either fixed or configured via higher layer (e.g., RRC) signaling or reported by the UE. The UE reports $\{\sigma_i\}$, $\{u_i\}$, and $\{v_i\}$ for all i=0, 1, ..., d−1 as the explicit CSI. In one alternative, if $\sigma_i=0$, then corresponding $u_i$ and $v_i$ are not reported (since it does not contribute to the linear sum). In another alternative, $u_i$ and $v_i$ are reported regardless of the corresponding reported $\sigma_i$ value.

If M>1, then at least one of the following schemes is used to report the CSI.

In scheme 21-1, the 3D matrix $H_{M,N,K}$ is transformed to a two-dimensional (2D) $MN \times K$ matrix $H_{MN,K}$ by collapsing (merging) the first (Rx) and second (Tx) components into one according to one of the following example transformations.

In one example of Ex 21-1-1, for all m=0, 1, ..., M−1, for all n=0, 1, ..., N−1, and for all k=0, 1, ..., K−1, $H_{MN,K}(mN+n, k) = H_{M,N,K}(m, n, k)$.

In one example of Ex 21-1-2, for all n=0, 1, ..., N−1, for all m=0, 1, ..., M−1, and for all k=0, 1, ..., K−1, $H_{MN,K}(nM+m, k) = H_{M,N,K}(m, n, k)$.

The transformed 2D matrix $H_{MN,K}$ is represented as a weighted (linear) sum of d outer product matrices ($Z_i = u_i v_i^H$), i.e., $H_{MN,K} \cong \sum_{i=0}^{d-1} \sigma_i Z_i$, where: $\sigma_i$ is a non-negative real number; $u_i$ is a $MN \times 1$ column vector; and $v_i$ is a $K \times 1$ column vector.

The value d belongs to $\{1, 2, \ldots, \min(MN,K)\}$ and is either fixed or configured via higher layer (e.g., RRC) signaling or reported by the UE. The UE reports $\{\sigma_i\}$, $\{u_i\}$, and $\{v_i\}$ for all i=0, 1, ..., d−1 as the explicit CSI. In one alternative, if $\sigma_i=0$, then corresponding $u_i$ and $v_i$ are not reported (since it does not contribute to the linear sum). In another alternative, $u_i$ and $v_i$ are reported regardless of the corresponding reported $\sigma_i$ value.

In scheme 21-2, the 3D matrix $H_{M,N,K}$ is transformed to a two-dimensional (2D) $N \times MK$ matrix $H_{N,MK}$ by collapsing (merging) the first (Rx) and third (frequency) components into one according to one of the following example transformations.

In one example of Ex 21-2-1, for all m=0, 1, ..., M−1, for all n=0, 1, ..., N−1, and for all k=0, 1, ..., K−1, $H_{N,MK}(n, mK+k) = H_{M,N,K}(m, n, k)$.

In one example of Ex 21-2-2, for all n=0, 1, ..., N−1, for all m=0, 1, ..., M−1, and for all k=0, 1, ..., K−1, $H_{N,MK}(n, kM+m) = H_{M,N,K}(m,n,k)$.

The transformed 2D matrix $H_{N,MK}$ is represented as a weighted (linear) sum of d outer product matrices ($Z_i = u_i v_i^H$) i.e., $H_{N,MK} \cong \sum_{i=0}^{d-1} \sigma_i Z_i$, where: $\sigma_i$ is a non-negative real number; $u_i$ is a $N \times 1$ column vector; and $v_i$ is a $MK \times 1$ column vector.

The value d belongs to $\{1, 2, \ldots, \min(N,MK)\}$ and is either fixed or configured via higher layer (e.g., RRC) signaling or reported by the UE. The UE reports $\{\sigma_i\}$, $\{u_i\}$, and $\{v_i\}$ for all i=0, 1, ..., d−1 as the explicit CSI. In one alternative, if $\sigma_i=0$, then corresponding $u_i$ and $v_i$ are not reported (since it does not contribute to the linear sum). In another alternative, $u_i$ and $v_i$ are reported regardless of the corresponding reported $\sigma_i$ value.

In Scheme 21-3, for each Rx component m=0, 1, ..., M−1, the 3D matrix $H_{M,N,K}$ reduces to a 2D $N \times K$ matrix $H_{N,K}^{(m)}$, which is represented as a weighted (linear) sum of $d_m$ outer product matrices ($Z_{m,i} = u_{m,i} v_{m,i}^H$), i.e., $H_{N,K}^{(m)} \cong \sum_{i=0}^{d_m-1} \sigma_{m,i} Z_{m,i}$, where: $\sigma_{m,i}$ is a non-negative real number; $u_{m,i}$ is a $N \times 1$ column vector; and $v_{m,i}$ is a $K \times 1$ column vector.

The value $d_m$ belongs to $\{1, 2, \ldots, \min(N,K)\}$ and is either fixed or configured via higher layer (e.g., RRC) signaling or reported by the UE. The UE reports $\{\sigma_{m,i}\}$, $\{u_{m,i}\}$, and $\{v_{m,i}\}$ for all i=0, 1, ..., $d_m$−1 as the explicit CSI representing $H_{N,K}^{(m)}$. In one alternative, if $\sigma_{m,i}=0$, then corresponding $u_{m,i}$ and $v_{m,i}$ are not reported (since it does contribute to the linear sum). In another alternative, and $u_{m,i}$ m $v_{m,i}$ are reported regardless of the corresponding reported $\sigma_{m,i}$ value.

In one alternative, $d_m=d$ for all m=0, 1, 2, . . . , M−1. In another alternative, $d_m$ is different for different values of m.

In one alternative, $d_m=d$ and $u_{m,i}=u_i$ for all m=0, 1, 2, . . . , M−1, hence $\{u_i: i=0, 1, . . . , d-1\}$ is reported common for all Rx components. In another alternative, $u_{m,i}$ is reported for each value of m.

In one alternative, $d_m=d$ and $v_{m,i}=v_i$ for all m=0, 1, 2, . . . , M−1, hence $\{v_i: i=0, 1, . . . , d-1\}$ is reported common for all Tx components. In another alternative, $v_{m,i}$ is reported for each value of m.

In one alternative, $d_m=d$, $u_{m,i}=u_i$, and $v_{m,i}=v_i1$ for all m=0, 1, 2, . . . , M−1, hence $\{u_i: i=0, 1, . . . , d-1\}$ and $\{v_i: i=0, 1, . . . , d-1\}$ respectively are reported common for all Rx and Tx components. In another alternative, $u_{m,i}$ and $v_{m,i}$ are reported for each value of m.

In Scheme 21-4, the explicit CSI reporting is according to Scheme 21-1 or 21-2 if MN<a (or MN≤a), and the explicit CSI reporting is according to Scheme 21-3 if MN≥a (or MN>a), where the fixed number a is according to at least one of the following alternatives.

In one example of Alt 21-4-1: $a=N_{max}$ is a maximum number of antenna ports at the gNB (Tx components) for Scheme 1-1 or 1-2, e.g. $N_{max}=8$.

In one example of Alt 21-4-2: $a=M_{max}$ is a maximum number of antenna ports at the UE (Rx components) for Scheme 21-1 or 1-2, e.g. $M_{max}=2$.

In one example of Alt 21-4-3: $a=(M\times N)_{max}$ is a maximum number of the product of antenna ports at the gNB (Tx components) and at the UE (Rx components) for Scheme 21-1 or 21-2, e.g., $(M\times N)_{max}=16$ or 32.

In Scheme 21-5, the 3D matrix $H_{M,N,K}$ is represented as a weighted (linear) sum of d tensor product matrices ($Y_i=w_i\otimes Z_i$ where $Z_i=u_iv_i^H$), i.e., $H_{M,N,K}\approx\Sigma_{i=0}^{d-1}\sigma_iY_i$, where: $\sigma_i$ is a non-negative real number; $w_i$ is a M×1 column vector; $u_i$ is a N×1 column vector; $v_i$ is a K×1 column vector; and the notation $\otimes$ denotes the tensor product.

Note that $Y_i$ is a M×N×K 3D matrix whose (m, n, k)-th entry is $Y_i(m,n,k)=w_i(m)Z_i(n,k)=w_i(m)u_i(n)v_i^H(k)$.

The value d belongs to $\{1, 2, . . . , M\times min(N,K)\}$ and is either fixed or configured via higher layer (e.g., RRC) signaling or reported by the UE. The UE reports $\{\sigma_i\}$, $\{w_i\}$, $\{u_i\}$, and $\{v_i\}$ for all i=0, 1, . . . , d−1 as the explicit CSI. In one alternative, if $\sigma_i=0$, then corresponding $w_i$, $u_i$ and $v_i$ are not reported (since it does not contribute to the linear sum). In another alternative, $w_i$, $u_i$ and $v_i$ are reported regardless of the corresponding reported $\sigma_i$ value.

In Sub-embodiment 21A, the number of Rx components (M) in the matrix $H_{M,N,K}$ is determined according to at least one of the following alternatives.

In one example of Alt 21A-1, M is fixed, for example M=number of antenna ports at the UE.

In one example of Alt 21A-2, the UE reports a preferred M value (similar to RI) as part of the explicit CSI report.

In one example of Ex 21A-1, if the matrix $H_{M,N,K}$ corresponds to the DL channel, then the UE reports a preferred M value which corresponds to M antenna ports (e.g. antenna port number 1, 2, . . . , M) at the UE.

In one example of Ex 21A-2, if the matrix $H_{M,N,K}$ corresponds to the eigenvectors of the DL channel, then the UE reports a preferred M value which corresponds to M layers (i.e., M=RI).

In one example of Alt 21A-3, the gNB configures (e.g. via higher layer signaling) the value M.

In Sub-embodiment 21B, the number of Tx components (N) in the matrix $H_{M,N,K}$ is determined according to at least one of the following alternatives.

In one example of Alt 21B-1, N is fixed, for example N=number of antenna ports at the gNB.

In one example of Alt 21B-2, the gNB configures (e.g. via higher layer signaling) the value N.

In embodiment 22, a UE is configured/triggered to report a single CSI in P≥1 CSI parts (where, e.g., each CSI part is determined/reported according to embodiment 1) included in one or multiple uplink control information (UCI) segments per slot (or subframe or reporting instance) according to at least one of the following alternatives. One of these alternatives is either fixed in the specification (e.g., Alt 22-1) or configured via higher layer RRC or MAC CE based or DCI based signaling.

Figure 23:
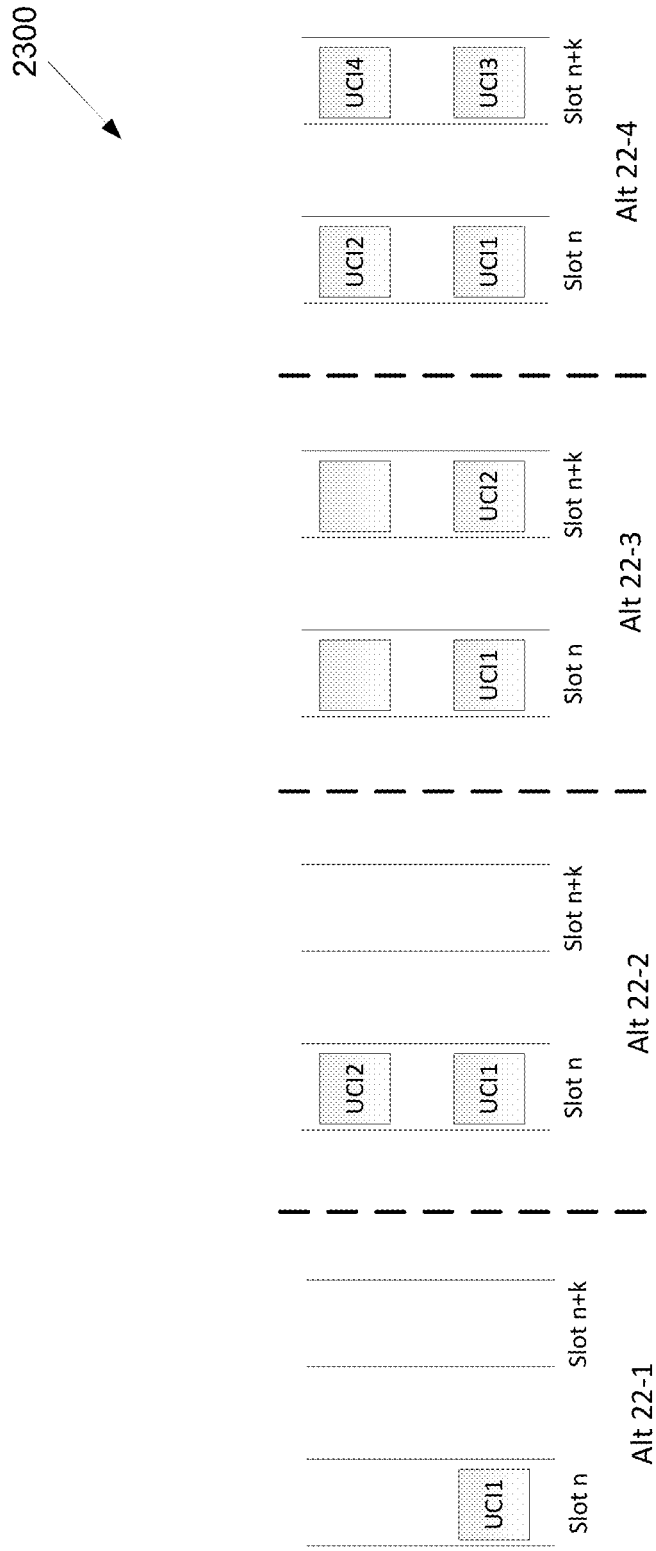
FIG. 23 illustrates an example UCI transmission according to embodiments of the present disclosure.

FIG. 23 illustrates an example UCI transmission 2300 according to embodiments of the present disclosure. The embodiment of the UCI transmission 2300 illustrated in FIG. 23 is for illustration only. FIG. 23 does not limit the scope of this disclosure to any particular implementation.

In one example of Alt 22-1, when P=1, CSI is included in a single UCI segment. An example is shown in FIG. 23.

In one example of Alt 22-2, when P>1, P CSI parts are included in P UCI segments that are transmitted in the same slot, i.e. P UCI segments are transmitted in a single slot. An example is shown in FIG. 23. where P=2.

In one example of Alt 22-3, when P>1, P CSI parts are included in P UCI segments that are transmitted in P different slots, i.e. one UCI segment is transmitted per slot. An example is shown in FIG. 23. where P=2.

In one example of Alt 22-4, when P>1, P CSI parts are included in P UCI segments that are transmitted in Q different slots, where P/Q UCI segments are transmitted per slot. An example is shown in FIG. 23. where P=4 and Q=2.

In one example of Ex 22-1, the P value (e.g. P=1, 2, or 4) is determined implicitly (without any additional signaling/configuration/indication). For example, the value P is determined depending on the size of the matrix $H_{M,N,K}$ according to at least one of the following alternatives. One of these alternatives is either fixed in the specification (e.g., Alt 22-1-1) or configured via higher layer RRC or MAC CE based or DCI based signaling.

In one example of Alt 22-1-1, the value P is determined depending on the value M. For example, the maximum number of Rx components (M') that can be reported in each CSI part is fixed (e.g., M'=1 or 2). If M≤M', then P=1; otherwise, P>1. Alternatively, $$P = \left\lceil \frac{M}{M'} \right\rceil.$$

In one example of Alt 22-1-2, the value P is determined depending on the value N. For example, the maximum number of Tx components (N') that can be reported in each CSI part is fixed (e.g., N'=8). If N≤N', then P=1; otherwise, P>1. Alternatively, $$P = \left\lceil \frac{N}{N'} \right\rceil.$$

In one example of Alt 22-1-3, the value P is determined depending on the value K. For example, the maximum number of frequency components (K') that can be reported in each CSI part is fixed. If K≤K', then P=1; otherwise, P>1. Alternatively, $$P = \left\lceil \frac{K}{K'} \right\rceil.$$

In one example of Alt 22-1-4, the value P is determined depending on the values M and N. For example, the maximum number of Rx and Tx components (M') that can be reported in each CSI part is fixed. If MN≤M', then P=1; otherwise, P>1. Alternatively, $$P = \left\lceil \frac{MN}{M'} \right\rceil.$$

In an example, if P=2, then the two CSI parts are formed by partitioning one of Rx or Tx components into two parts. In another example, if P=4, then the four CSI parts are formed by partitioning each Rx and Tx components into two parts.

In one example of Alt 22-1-5, the value P is determined depending on the values M and K. For example, the maximum number of Rx and frequency components (M') that can be reported in each CSI part is fixed. If MK≤M', then P=1; otherwise, P>1. Alternatively, $$P = \left\lceil \frac{MK}{M'} \right\rceil.$$

In an example, if P=2, then the two CSI parts are formed by partitioning one of Rx or frequency components into two parts. In another example, if P=4, then the four CSI parts are formed by partitioning each Rx and frequency components into two parts.

In one example of Alt 22-1-6, the value P is determined depending on the values K and N. For example, the maximum number of Tx and frequency components (M') that can be reported in each CSI part is fixed. If NK≤M', then P=1; otherwise, P>1. Alternatively, $$P = \left\lceil \frac{NK}{M'} \right\rceil.$$

In an example, if P=2, then the two CSI parts are formed by partitioning one of Tx or frequency components into two parts. In another example, if P=4, then the four CSI parts are formed by partitioning each Tx and frequency components into two parts.

In one example of Alt 22-1-7, the value P is determined depending on the values M, N, and K.

In one example of Ex 22-2, the P value (e.g. P=1, 2, or 4) is determined explicitly. For example, a gNB configures the P value via higher layer (RRC) or MAC CE based or DCI signaling. The UE partitions the CSI into P parts according to at least one of the following alternatives.

In one example of Alt 22-2-1, if P=2, then the two CSI parts are formed by partitioning one of Rx or Tx or frequency components into two parts.

In one example of Alt 22-2-2, if P=4, then the four CSI parts are formed by partitioning each of Rx and Tx components into two parts.

In one example of Alt 22-2-3, if P=4, then the four CSI parts are formed by partitioning each of Rx and frequency components into two parts.

In one example of Alt 22-2-4, if P=4, then the four CSI parts are formed by partitioning each of frequency and Tx components into two parts.

In Sub-embodiment 22A, a UE is configured/triggered to report a single CSI in P≥1 CSI parts (where, e.g., each CSI part is determined/reported according to embodiment 1) included in P UCI segments (cf. embodiment 2), wherein the first UCI segment (UCI1) is always present, and includes an indication (I) indicating whether P=1 (i.e., there is no additional CSI parts or UCI segments) or P>1 (i.e., there are P−1 additional CSI parts or UCI segments).

In one example of Ex 22A-1, the indication I corresponds to a 1 bit indication. If I=0, then there is no additional CSI parts or UCI segments. If I=0, then there is one additional CSI part or UCI segment (e.g., Alt 22-2 or 22-3 in FIG. 23).

In one example of Ex 22A-2, the indication I corresponds to a 2 bit indication. If I=00, then there is no additional CSI parts or UCI segments. If I=01, then there is one additional CSI part or UCI segment (e.g., Alt 22-2 or 22-3 in FIG. 23). If I=10, then there is two additional CSI parts or UCI segments. If I=11, then there is three additional CSI parts or UCI segments (e.g., Alt 22-4 in FIG. 23).

In one example of Ex 22A-3, the indication I corresponds to the M value (indicating number of UE Rx components, or rank value).

If the indication I corresponds to a 1 bit indication, then they (I=0 and I=1 respectively) correspond to either M=1 and M>1 or M=1 and M=2. If M=1, then there is no additional CSI parts or UCI segments. If M=2 or M>1, then there is one additional CSI part or UCI segment (e.g., Alt 22-2 or 22-3 in FIG. 23).

If the indication/corresponds to a 2 bit indication, then they (I=00, I=01, I=10 and I=11 respectively) correspond to M=1, 2, 3, and 4. If M=1, then there is no additional CSI parts or UCI segments. If M=2, then there is one additional CSI part or UCI segment (e.g., Alt 22-2 or 22-3 in FIG. 23). If M=3, then there is two additional CSI parts or UCI segments. If M=4, then there is three additional CSI parts or UCI segments (e.g. Alt 22-4 in FIG. 23).

In Sub-embodiment 22B, a UE is configured/triggered to report T>1 CSIs in P≥1 CSI parts (where, e.g., each CSI part is determined/reported according to embodiment 1) included in one or multiple uplink control information (UCI) segments per slot (or subframe or reporting instance) according to at one of the alternatives/examples in embodiment 22 or sub-embodiment 22A. In one example, each CSI part (or UCI segment) comprises a part of all T>1 CSIs. In another example, at least one CSI part (or UCI segment) comprises a part of a subset of T>1 CSIs.

In one Embodiment 23, a UE is configured (e.g. via higher layer RRC signaling) or triggered (e.g., via DCI signaling) to report "explicit CSI" representing the matrix $H_{M,N,K}$ (embodiment 1) where the CSI has two components.

For dimension reduction, the number of components in at least one of Rx, Tx, and frequency dimensions of $H_{M,N,K}$ is reduced using a set of basis vectors. Let $H_{M',N',K'}$ be the explicit CSI matrix after dimension reduction, where M'≤M, N'≤N, and K'≤K. Note that there is dimension reduction only when at least one of M'<M, N'<N, or K'<K. The set of basis vectors is also reported by the UE as part of the CSI.

For compression, the resultant reduced dimensional explicit CSI matrix $H_{M',N',K'}$ is then represented/reported according to alternatives/examples in embodiment 21 and/or 22.

In one example of Ex 23-1, the dimension reduction is considered in Tx dimension (i.e., M'=M, N'<N, and K'=K). For each Rx component m=0, 1, . . . , M−1, the 3D matrix $H_{M,N,K}$ reduces to a 2D N×K matrix $H_{N,K}^{(m)}$ which is reduced to a 2D N'×K matrix $H_{N',K}^{(m)}$ using a set of basis vectors A=[$a_0$ $a_1$ . . . $a_{N'-1}$] in Tx dimension, i.e., $$H_{N,K}^{(m)} =$$

$$AH_{N',K}^{(m)} = [a_0 \ a_1 \ \ldots \ a_{N'-1}] \begin{bmatrix} c_{m,0,0} & c_{m,0,1} & \cdots & c_{m,0,K-1} \\ c_{m,1,0} & c_{m,1,1} & \cdots & c_{m,1,K-1} \\ \vdots & \vdots & \vdots & \vdots \\ c_{m,N'-1,0} & c_{m,N'-1,1} & \cdots & c_{m,N'-1,K-1} \end{bmatrix} =$$

$$\left[ \sum_{i=0}^{N'-1} c_{m,i,0} a_i \quad \sum_{i=0}^{N'-1} c_{m,i,1} a_i \quad \ldots \quad \sum_{i=0}^{N'-1} c_{m,i,K-1} a_i \right].$$

Note that if columns of basis set A is orthogonal, then $H_{N',K}^{(m)}=A^H H_{N,K}^{(m)}$. The reduced dimensional explicit CSI matrix $H_{M,N',K}$ is then obtained by concatenating matrices $H_{N',K}^{(m)}$ for all m=0, 1, . . . , M−1 in the first dimension, similar to the matrix $H_{M,N,K}$.

In one example of Ex 23-2, the dimension reduction is considered in Tx dimension (i.e., M'=M, N'<N, and K'=K). For each Rx component m=0, 1, . . . , M−1, the 3D matrix $H_{M,N,K}$ reduces to a 2D N×K matrix $H_{N,K}^{(m)}$, which is reduced to a 2D N'×K matrix $H_{N',K}^{(m)}$) using a set of basis vectors $$A = \begin{bmatrix} a_0 & a_1 & \cdots & a_{\frac{N'}{2}-1} \end{bmatrix}$$

in Tx dimension, i.e., $$H_{N,K}^{(m)} = \begin{bmatrix} A & 0 \\ 0 & A \end{bmatrix} H_{N',K}^{(m)} = \begin{bmatrix} a_0 & a_1 & \cdots & a_{\frac{N'}{2}-1} & & & 0 & \\ & & 0 & & a_0 & a_1 & \cdots & a_{\frac{N'}{2}-1} \end{bmatrix}$$

$$\begin{bmatrix} c_{m,0,0} & c_{m,0,1} & \cdots & c_{m,0,K-1} \\ c_{m,1,0} & c_{m,1,1} & \cdots & c_{m,1,K-1} \\ \vdots & \vdots & \vdots & \vdots \\ c_{m,N'-1,0} & c_{m,N'-1,1} & \cdots & c_{m,N'-1,K-1} \end{bmatrix} =$$

$$\begin{bmatrix} \sum_{i=0}^{\frac{N'}{2}-1} c_{m,i,0} a_i & \sum_{i=0}^{\frac{N'}{2}-1} c_{m,i,1} a_i & \cdots & \sum_{i=0}^{\frac{N'}{2}-1} c_{m,i,K-1} a_i \\ \sum_{i=0}^{\frac{N'}{2}-1} c_{m,i+\frac{N'}{2},0} a_i & \sum_{i=0}^{\frac{N'}{2}-1} c_{m,i+\frac{N'}{2},1} a_i & \cdots & \sum_{i=0}^{\frac{N'}{2}-1} c_{m,i+\frac{N'}{2},K-1} a_i \end{bmatrix}.$$

Note that if columns of basis set A is orthogonal, then $$H_{N',K}^{(m)} = \begin{bmatrix} A & 0 \\ 0 & A \end{bmatrix}^H H_{N,K}^{(m)}.$$

The reduced dimensional explicit CSI matrix $H_{M,N',K}$ is then obtained by concatenating matrices $H_{N',K}^{(m)}$ for all m=0, 1, . . . , M−1 in the first dimension, similar to the matrix $H_{M,N,K}$.

In one example of Ex 23-3, the dimension reduction is considered in Tx and frequency dimensions (i.e., M'=M, N'<N, and K'<K). For each Rx component m=0, 1, . . . , M−1, the 3D matrix $H_{M,N,K}$ reduces to a 2D N×K matrix $H_{N,K}^{(m)}$, which is reduced to a 2D N'×K' matrix $H_{N',K'}^{(m)}$ using a set of basis vectors A=[$a_0$ $a_1$ . . . $a_{N'-1}$] and B=[$b_0 b_1$ . . . $b_{K'-1}$] in Tx and frequency dimensions, respectively, i.e., $$H_{N,K}^{(m)} =$$

$$AH_{N',K'}^{(m)}B^H = [a_0 \ a_1 \ \ldots \ a_{N'-1}] \begin{bmatrix} c_{m,0,0} & c_{m,0,1} & \cdots & c_{m,0,K-1} \\ c_{m,1,0} & c_{m,1,1} & \cdots & c_{m,1,K-1} \\ \vdots & \vdots & \vdots & \vdots \\ c_{m,N'-1,0} & c_{m,N'-1,1} & \cdots & c_{m,N'-1,K-1} \end{bmatrix}$$

$$[b_0 \ b_1 \ \ldots \ b_{N'-1}]^H = \sum_{k=0}^{K'-1} \sum_{i=0}^{N'-1} c_{m,i,k}(a_i b_k^H).$$

Note that if columns of basis sets A and B are orthogonal, then $H_{N',K'}^{(m)}=A^H H_{N,K}^{(m)} B$. The reduced dimensional explicit CSI matrix $H_{M,N',K'}$ is then obtained by concatenating matrices $H_{N',K'}^{(m)}$ for all m=0, 1, . . . , M−1 in the first dimension, similar to the matrix $H_{M,N,K}$.

In one example of Ex 23-4, the dimension reduction is considered in Tx and frequency dimensions (i.e., M'=M, N'<N, and K'<K). For each Rx component m=0, 1, . . . , M−1, the 3D matrix $H_{M,N,K}$ reduces to a 2D N×K matrix $H_{N,K}^{(m)}$, which is reduced to a 2D N'×K' matrix $H_{N',K'}^{(m)}$, using a set of basis vectors $$A = \begin{bmatrix} a_0 & a_1 & \cdots & a_{\frac{N'}{2}-1} \end{bmatrix}$$

and B=[$b_0$ $b_1$ . . . $b_{K'-1}$] in Tx and frequency dimensions, respectively, i.e., $$H_{N,K}^{(m)} = \begin{bmatrix} A & 0 \\ 0 & A \end{bmatrix} H_{N',K'}^{(m)} B^H = \begin{bmatrix} a_0 & a_1 & \cdots & a_{\frac{N'}{2}-1} & & & 0 & \\ & & 0 & & a_0 & a_1 & \cdots & a_{\frac{N'}{2}-1} \end{bmatrix}$$

$$\begin{bmatrix} c_{m,0,0} & c_{m,0,1} & \cdots & c_{m,0,K-1} \\ c_{m,1,0} & c_{m,1,1} & \cdots & c_{m,1,K-1} \\ \vdots & \vdots & \vdots & \vdots \\ c_{m,N'-1,0} & c_{m,N'-1,1} & \cdots & c_{m,N'-1,K-1} \end{bmatrix}$$

$$[b_0 \ b_1 \ \ldots \ b_{K'-1}]^H = \begin{bmatrix} \sum_{k=0}^{K'-1} \sum_{i=0}^{\frac{N'}{2}-1} c_{m,i,k}(a_i b_k^H) \\ \sum_{k=0}^{K'-1} \sum_{i=0}^{\frac{N'}{2}-1} c_{m,i+\frac{N'}{2},k}(a_i b_k^H) \end{bmatrix}$$

Note that if columns of basis sets A and B are orthogonal, then $$H_{N',K'}^{(m)} = \begin{bmatrix} A & 0 \\ 0 & A \end{bmatrix}^H H_{N,K}^{(m)} B.$$

The reduced dimensional explicit CSI matrix $H_{M,N',K'}$ is then obtained by concatenating matrices $H_{N',K'}^{(m)}$ for all m=0, 1, . . . , M−1 in the first dimension, similar to the matrix $H_{M,N,K}$.

In Sub-embodiment 23A, columns of A and B in Ex 23-2 and Ex 23-4 are selected from oversampled DFT codebooks. For example, for N=$2N_1 N_2$ (FIG. 12) $a_i=v_{l,m}$ and $b_k=w_k$, where the quantities $v_{l,m}$ and $w_k$ are given by $$u_m = \begin{cases} \begin{bmatrix} 1 & e^{j\frac{2\pi m}{O_2 N_2}} & \cdots & e^{j\frac{2\pi m(N_2-1)}{O_2 N_2}} \end{bmatrix} & N_2 > 1 \\ 1 & N_2 = 1 \end{cases}$$

$$v_{l,m} = \begin{bmatrix} u_m & e^{j\frac{2\pi l}{O_1 N_1}} u_m & \cdots & e^{j\frac{2\pi l(N-1)}{O_1 N_1}} u_m \end{bmatrix}^T,$$

-continued
$$w_k = \begin{bmatrix} 1 & e^{j\frac{2\pi k}{O_3 N_3}} & \ldots & e^{j\frac{2\pi k(K-1)}{O_3 K}} \end{bmatrix}$$

where $O_1$, $O_2$, and $O_3$ are oversampling factors.

In Sub-embodiment 23B, columns of B in Ex 23-2 and Ex 23-4 are selected from a oversampled DFT codebook (as in sub-embodiment 23A), and column $a_i$ of A is a $N_1 N_2 \times 1$ or $$\frac{N}{2} \times 1$$

port selection column vector, where a port selection vector is a defined as a vector which contains a value of 1 in one element and zeros elsewhere.

Likewise, columns of B in Ex 23-1 and Ex 23-3 are selected from a oversampled DFT codebook (as in sub-embodiment 23A), and column $a_i$ of A is a $2N_1 N_2 \times 1$ or $N \times 1$ port selection column vector, where a port selection vector is a defined as a vector which contains a value of 1 in one element and zeros elsewhere.

In one embodiment 24, the UE first determines unquantized $\{\sigma_i\}$, $\{u_i\}$, and $\{v1\}$ (and $\{w_i\}$), for all i=0, 1 ..., d-1 and then quantizes and reports them using a codebook.

For example, if M=1, then principal component analysis (PCA) based on the singular value decomposition (SVD) of $H_{K,N}$ is used, i.e., $H_{K,N} = U\Sigma V^H = \Sigma_{i=0}^{D-1} P\sigma_i u_i v_i^H$, where: $U=[u_0 u_1 \ldots u_{K-1}]$ is the left eigenvector matrix (columns are length-N eigenvectors); $V=[v_0 v_1 \ldots v_{N-1}]$ is the right eigenvector matrix (columns are length-K eigenvectors); $\Sigma = \text{diag}([\sigma_0 \sigma_1 \ldots \sigma_{D-1}])$ is a diagonal matrix of singular values sorted as $\sigma_0 \geq \sigma_1 \geq \ldots \geq \sigma_{D-1}$; and D=min(K, N).

Then, d principal components corresponding to "dominant" singular values $\sigma_0, \ldots \sigma_{d-1}$ and corresponding left and right eigenvector matrices are constructed as $U_d=[u_0 u_1 \ldots u_{d-1}]$, $V_d=[v_0 v_1 \ldots v_{d-1}]$, and $\Sigma_d = \text{diag}([\sigma_0 \sigma_1 \ldots \sigma_{d-1}])$.

The reduced dimensional or compressed explicit CSI matrix is then given by $H_{K,N} \approx \tilde{H}_{K,N} = U_d \Sigma_d V_d^H = \Sigma_{i=0}^{d-1} \sigma_i u_i v_i^H$. This method (PCA based on SVD) can also be used for the case when M>1.

Assuming $\sigma_0 \geq \sigma_1 \geq \ldots$, at least one the following methods is used to quantize/report $\{\sigma_i\}$. Let $\hat{\sigma}_i$ be the quantized value of $\sigma_i$ that is reported by the UE.

In one example of Alt 24-1, (independent reporting) $\sigma_i$ is quantized/reported using a $N_i$ bit codebook over [0,A], where A is a positive number. In one example, $N_i=N$ for all i. In another example, $N_i \geq N_{i+1}$ for all i. In another example, $N_i > N_{i+1}$ for all i.

In one example of Alt 24-2, (differential reporting) $\sigma_0$ is quantized/reported using a $N_0$ bit codebook over [0, $A_0$], where $A_0$ is a positive number. In one example, $N_0=5$. An example of the $N_0$ bit codebook is a uniform codebook over [0, $A_0$], e.g., $\{0, 1, 2, \ldots, 2^{N_0}-1\}$*s, where $$s = \frac{A_0}{2^{N_0}}.$$

Note that $A_0$ can be in linear scale. Or, it can be in decibel (dB) scale, i.e., $A_0 = 10 \log_{10} a_0$, where $a_0 > 1$. In case of dB scale, $10 \log_{10} \sigma_0$ is quantized/reported.

In such example, for i>0, $\rho_i = \sigma_i / \sigma_0$ is quantized/reported using a $N_1$ bit codebook over [0, $A_1$], where $A_1$ is a positive number. Let $\hat{\rho}_i$ be the quantized value of $\rho_i$ that is reported by the UE. Then, $\hat{\sigma}_i = \hat{\sigma}_0 \hat{\rho}_i$. In one example, $N_1=3$. An example of 3-bit codebook is WB amplitude codebook to report WB coefficient amplitudes in LTE/NR Type II CSI codebook.

In one example of Alt 24-3, (differential reporting) $\sigma_0$ is quantized/reported as in Alt 24-2. In such example, for i>0, $\rho_i = \sigma_i / \sigma_{i-1}$ is quantized/reported using $N_1$ bit codebook over [0, $A_1$], where $A_1$ is a positive number. Let $\hat{\rho}_i$ be the quantized value of $\rho_i$ that is reported by the UE. Then, $\hat{\sigma}_i = \hat{\sigma}_{i-1} \hat{\rho}_i$. In one example, $N_1=3$. An example of 3-bit codebook is WB amplitude codebook to report WB coefficient amplitudes in LTE/NR Type II CSI codebook.

In one example of Alt 24-4, (differential reporting) for i=0, $\sigma_0$ is quantized/reported as $\hat{\sigma}_0 = \alpha_0$ as in Alt 24-2. In such example, for i>0, $\sigma_i$ is quantized as $\hat{\sigma}_i = \hat{\sigma}_0 \beta_i = \hat{\sigma}_0 \beta_i$, and $\beta_i$ is reported by the UE using a $N_1$ bit codebook over [0, $A_1$], where $A_1$ is a positive number. In one example, $N_1=3$. An example of 3-bit codebook is WB amplitude codebook to report WB coefficient amplitudes in LTE/NR Type II CSI codebook.

In one example of Alt 24-5, (differential reporting) for i=0, $\sigma_0$ is quantized/reported as $\hat{\sigma}_0 = \alpha_0$ as in Alt 24-2. In such example, for i>0, $\sigma_i$ is quantized as $\hat{\sigma}_i = \hat{\sigma}_{i-1} \beta_i$, and $\beta_i$ is reported by the UE using a $N_1$ bit codebook over [0, $A_1$], where $A_1$ is a positive number. In one example, $N_1=3$. An example of 3-bit codebook is WB amplitude codebook to report WB coefficient amplitudes in LTE/NR Type II CSI codebook.

In one embodiment 25, a UE is configured (e.g., via higher layer RRC signaling) or triggered (e.g., via DCI signaling) to report "explicit CSI" representing a three-dimensional (3D) M×N×K matrix $H'_{M,N,K}$, where the first and second dimensions of the matrix $H'_{M,N,K}$ are the same as that of the matrix $H'_{M,N,K}$ in embodiment 21, and the third dimension comprises K time domain components of the channel.

In one example, the time domain matrix $H'_{M,N,K}$ is obtained by performing inverse fast Fourier transform (IFFT) or inverse discrete Fourier transform (IDFT) of the frequency domain matrix $H_{M,N,K}$. The embodiments (e.g., embodiments 21-24) about reporting frequency domain matrix $H_{M,N,K}$ can be straightforwardly extended/applied to report time domain matrix $H'_{M,N,K}$. In particular, the time domain matrix $H'_{M,N,K}$ can be reduced to a lower dimensional matrix $H'_{M', N', K'}$ (as explained in the aforementioned embodiment 23), and then the reduced dimensional matrix $H'_{M', N', K'}$ is reported (as explained in the aforementioned embodiment 23).

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A terminal capable of reporting channel state information (CSI) in a wireless communication system, the terminal comprising:
   a transceiver configured to receive, from a base station (BS), CSI feedback configuration information indicating a number ($K_0$) of coefficients for CSI reporting; and a processor operably coupled to the transceiver, the processor configured to determine a number ($K_1$) of nonzero coefficients for CSI reporting based on the CSI feedback configuration information indicating the number ($K_0$) of coefficients for CSI reporting, wherein $K_1 \leq K_0$, wherein the transceiver is further configured to transmit, to the BS, a first part of a CSI feedback and a second part of the CSI feedback, the first part indicating the number of nonzero coefficients for CSI reporting and the second part including a bitmap to identify the nonzero coefficients for CSI reporting, and wherein, in case that a number of layers for CSI reporting is N>1:
the first part of the CSI feedback indicates a number of nonzero coefficients for all of the N layers, and
the second part of the CSI feedback includes N bitmaps for the N layers, a bitmap for a layer identifying nonzero coefficients for the layer.

2. The terminal of claim 1, wherein the number ($K_0$) of coefficients for CSI reporting is determined as $K_0=[a \times 2LM]$ based on the CSI feedback configuration information, where $a \leq 1$ and 2LM is a total number of coefficients.

3. The terminal of claim 2, wherein a is configured from a set of values including $\{1/4, 1/2\}$ based on the CSI feedback configuration information.

4. The terminal of claim 2, wherein:
the processor is further configured to:
identify the number of nonzero coefficients is $K_1$, and determine remaining $2LM-K_1$ coefficients as 0; and
the remaining $2LM-K_1$ coefficients are not reported.

5. The terminal of claim 2, wherein the bitmap comprises 2LM bits to indicate indices of the nonzero coefficients.

6. The terminal of claim 5, wherein:
the bitmap comprising 2LM bits comprises $K_1$ ones and $2LM-K_1$ zeros; and
an i-th bit of the bitmap is set to one in case that an i-th coefficient of the 2LM coefficients is included in the nonzero coefficients.

7. A base station (BS) for receiving a channel state information (CSI) feedback in a wireless communication system, the BS comprising:
a processor; and
a transceiver operably coupled to the processor, the transceiver configured to:
transmit, to a terminal, CSI feedback configuration information indicating a number ($K_0$) of coefficients for CSI reporting, and
receive, from the terminal, a first part of the CSI feedback and a second part of the CSI feedback, the first part indicating a number ($K_1$) of nonzero coefficients for CSI reporting and the second part including a bitmap to identify the nonzero coefficients for CSI reporting, wherein the number ($K_1$) of nonzero coefficients for CSI reporting is identified based on the CSI feedback configuration information indicating the number ($K_0$) of coefficients for CSI reporting, wherein $K_1 \leq K_0$, and wherein, in case that a number of layers for CSI reporting is N>1:
the first part of the CSI feedback indicates a number of nonzero coefficients for all of the N layers, and the second part of the CSI feedback includes N bitmaps for the N layers, a bitmap for a layer identifying nonzero coefficients for the layer.

8. The BS of claim 7, wherein the number ($K_0$) of coefficients for CSI reporting is determined as $K_0=[a \times 2LM]$ based on the CSI feedback configuration information, where $a \leq 1$ and 2LM is a total number of coefficients.

9. The BS of claim 8, wherein a is configured from a set of values including $\{1/4, 1/2\}$ based on the CSI feedback configuration information.

10. The BS of claim 8, wherein:
the number of nonzero coefficients is $K_1$;
remaining $2LM-K_1$ coefficients are determined as 0; and
the remaining $2LM-K_1$ coefficients are not received.

11. The BS of claim 8, wherein the bitmap comprises 2LM bits to indicate indices of the nonzero coefficients.

12. The BS of claim 11, wherein:
the bitmap comprising 2LM bits comprises $K_1$ ones and $2LM-K_1$ zeros; and
an i-th bit of the bitmap is set to one in case that an i-th coefficient of the 2LM coefficients is included in the nonzero coefficients.

13. A method performed by a terminal capable of reporting channel state information (CSI) in a wireless communication system, the method comprising:
receiving, from a base station (BS), CSI feedback configuration information indicating a number ($K_0$) of coefficients for CSI reporting;
determining a number ($K_1$) of nonzero coefficients for CSI reporting based on the CSI feedback configuration information indicating the number ($K_0$) of coefficients for CSI reporting, wherein $K_1 \leq K_0$; and
transmitting, to the BS, a first part of a CSI feedback and a second part of the CSI feedback, the first part indicating the number ($K_1$) of nonzero coefficients for CSI reporting and the second part including a bitmap to identify the nonzero coefficients for CSI reporting, wherein, in case that a number of layers for CSI reporting is N>1:
the first part of the CSI feedback indicates a number of nonzero coefficients for all of the N layers, and
the second part of the CSI feedback includes N bitmaps for the N layers, a bitmap for a layer identifying nonzero coefficients for the layer.

14. The method of claim 13, wherein the number ($K_0$) of coefficients for CSI reporting is determined as $K_0=[a \times 2LM]$ based on the CSI feedback configuration information, where $a \leq 1$ and 2LM is a total number of coefficients.

15. The method of claim 14, wherein a is configured from a set of values including $\{1/4, 1/2\}$ based on the CSI feedback configuration information.

16. The method of claim 14, further comprising:
identifying the number of nonzero coefficients is $K_1$; and
determining remaining $2LM-K_1$ coefficients as 0,
wherein the remaining $2LM-K_1$ coefficients are not reported.

17. The method of claim 14, wherein the bitmap comprises 2LM bits to indicate indices of the nonzero coefficients.

* * * * *